United States Patent [19]
Okamoto et al.

[11] Patent Number: 6,081,833
[45] Date of Patent: *Jun. 27, 2000

[54] MEMORY SPACE MANAGEMENT METHOD, DATA TRANSFER METHOD, AND COMPUTER DEVICE FOR DISTRIBUTED COMPUTER SYSTEM

[75] Inventors: Toshio Okamoto, Tokyo; Yoshiyuki Tsuda, Kanagawa-ken, both of Japan

[73] Assignee: Kabushiki Kaisha Toshiba, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/676,970

[22] Filed: Jul. 8, 1996

[30] Foreign Application Priority Data

Jul. 6, 1995 [JP] Japan .................................. 7-170796

[51] Int. Cl.⁷ .................................................. G06F 15/167
[52] U.S. Cl. ............................ 709/213; 709/217; 711/147
[58] Field of Search .......................... 395/200.47, 200.43; 709/217, 213, 215, 216, 227, 238, 245, 246; 710/10; 711/206, 203, 202, 208, 147, 148, 6

[56] References Cited

U.S. PATENT DOCUMENTS 5,111,389  5/1992  McAuliffe et al. ..................... 395/80
5,592,625  1/1997  Sandberg ........................... 395/200.18

OTHER PUBLICATIONS

Kozaki et al, "PVC Reservation on Shared Buffer Type ATM Switch for Data Communication," Communications, 1994, ICC '94, Supercomm/ICC '94, Conference Record, May 1994.

Primary Examiner—Mehmet B. Geckil
Attorney, Agent, or Firm—Foley & Lardner

[57] ABSTRACT

A scheme for realizing a high speed data transfer between memory spaces shared among computers in a distributed computer system, without requiring a complicated and inefficient communication protocol processing at the computer side. One region which is at least a part of a virtual memory space or a real memory space managed by one computer and another region which is at least a part of a virtual memory space or a real memory space managed by another computer are shared between these two computers, and a dedicated virtual connection is set up between these two shared regions. Then, a data transfer between these two shared regions is carried out by using the dedicated virtual connection. A virtual connection identifier of the dedicated virtual connection is registered into a corresponding page table entry in the page table, so that this virtual connection identifier can be obtained at a time of the data transfer by referring to the page table alone.

15 Claims, 19 Drawing Sheets

FIG.5

| ENTRY | FRAME NUMBER | EXIS-TENCE BIT | PRO-CESSING BIT | HARD DISK BIT | REMOTE HOST BIT | THREAD ID | OTHER INFORMATION (QoS INFORMATION ETC.) |
|---|---|---|---|---|---|---|---|
| 0 | VPI/VCI | 0 | 0 | 0 | 1 | a | 1 |
| 1 | FRAME1 | 1 | 0 | 0 | 0 | a | 0 |
| 2 | SECTOR4 | 0 | 1 | 1 | 0 | b | 0 |
| 3 | VPI/VCI | 0 | 0 | 0 | 0 | b | 0 |

FIG.6

| | CLIENT SIDE | | SERVER SIDE |
|---|---|---|---|
| TYPE 1 | VIRTUAL MEMORY SPACE | ←NETWORK CONNECTION→ | VIRTUAL MEMORY SPACE |
| TYPE 2 | VIRTUAL MEMORY SPACE | ←NETWORK CONNECTION→ | REAL MEMORY SPACE |
| TYPE 3 | REAL MEMORY SPACE | ←NETWORK CONNECTION→ | VIRTUAL MEMORY SPACE |
| TYPE 4 | REAL MEMORY SPACE | ←NETWORK CONNECTION→ | REAL MEMORY SPACE |

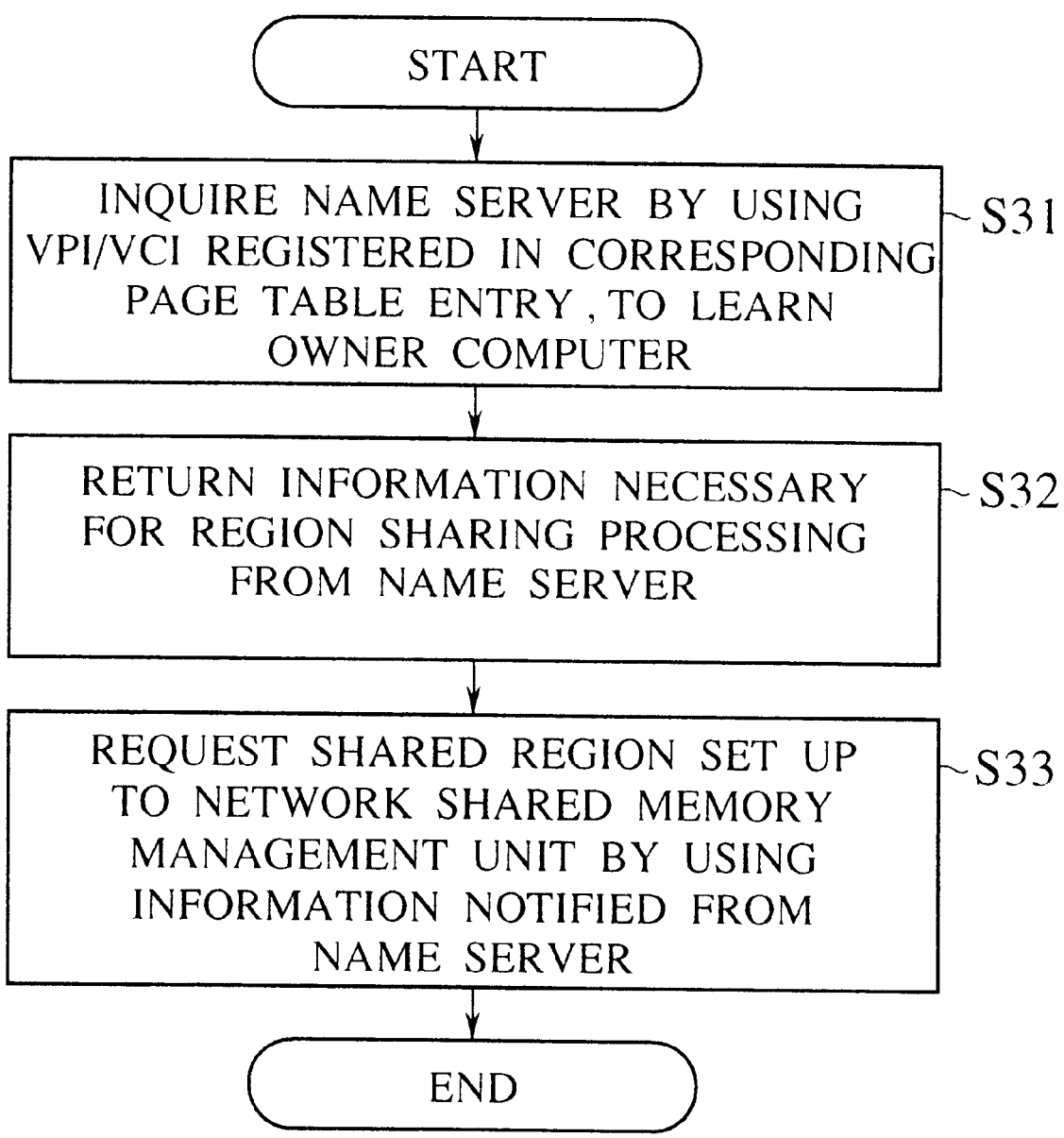

MEMORY SPACE MANAGEMENT METHOD, DATA TRANSFER METHOD, AND COMPUTER DEVICE FOR DISTRIBUTED COMPUTER SYSTEM

BACKGROUND OF THE INVENTION

1. Field of the Invention

The present invention relates to a memory space management method, a data transfer method, and a computer device to be used in a distributed computer system in which a plurality of computer systems having virtual memory space management mechanisms are interconnected through a network such as an ATM (Asynchronous Transfer Mode) network.

2. Description of the Background Art

In recent years, due to improvements of the computer performance and advances of the network technology, there is a trend for a distributed processing in which a job is executed on a plurality of computers by dividing a series of processings and carrying out the processings in cooperation using communications among the computers.

There are many different schemes for realizing a distributed computer system by interconnecting a plurality of computers.

For instance, the VAX-Cluster of the DEC has been realized by a configuration in which a plurality of computers are directly interconnected through communication channels, and this configuration has been implemented by means of special dedicated hardware. In this configuration, in order to realize a high speed communication, it has been necessary to arrange computers in close proximity so as to make a distance between computers short.

Another known scheme for realizing a distributed computer system is a multi-processor system with a hardware configuration having a plurality of processors on a single system bus.

On the other hand, due to advances of the network technology in recent years, a high speed network device has been standardized and offered at an inexpensive price. A representative example of such a high speed network device is an ATM network.

The ATM network is implemented by high speed switches, and the communication protocols are defined so that this ATM network can be utilized in a wide variety of environments ranging from WAN environment to LAN environment. For example, the communication protocols are defined for a call set up, a flow control, a congestion control, an error detection, a QoS (Quality of Service) management, etc.

There is a scheme for realizing a distributed computer system by interconnecting existing computers through such a high speed network. In this scheme, there is an advantage in that the distributed computer system can be implemented inexpensively as there is no need to use any special hardware, unlike the other schemes using cluster connections or system bus.

However, when the computer system utilizes the ATM mentioned above in a conventional communication scheme, the following problem arises. Namely, in a conventional communication scheme, the communication is made by using a network protocol processing for a computer such as TCP/IP implemented in the OS (Operating System) which is a basic software of a computer, but when the ATM is utilized in this TCP/IP scheme in a conventional way, the ATM will be regarded as a mere data link connection so that the characteristic properties of the ATM cannot be taken advantageously. In addition, the communication protocol processing is carried out entirely within a computer, so that there is a drawback in that the processing is heavy and therefore the communication throughput is poor.

Next, a conventional virtual memory space management mechanism will be described.

In a conventional computer, a virtual address written in a program is translated into a physical address by an address translation mechanism such as a page table, and an access to a real memory in a computer is made by using a translated physical address.

In the following, a conventional address translation mechanism will be described.

In order to improve the utilization efficiency, a real memory in a computer is managed and used in units called pages, where each page is in a size of 512 to 8K bytes. An individual page is called a "page frame".

In order to make an access to a real memory, a "frame number" for specifying a page and an "offset" for specifying a position within a page are necessary. Consequently, a "physical address" used in making an access to a real memory is formed by a set of "frame number" and "offset".

Similarly, a "virtual address" can be divided into two portions of "virtual frame number" and "offset".

At a time of translation from a virtual address to a physical address, an offset portion of a virtual address is not translated, and is set to an offset portion of a physical address as it is.

As for a virtual frame number, a (page) frame number after translation is written in a page table entry corresponding to a virtual frame number in the page table, so that by referring to the page table, a virtual frame number can be translated into a (page) frame number and therefore a virtual address can be translated into a physical address.

Note that the translation from a virtual address to a physical address is carried out frequently at a time of program execution, but in a case where the page table to be used in this translation exists on a real memory, it is necessary to make an access to a real memory every time this translation is to be carried out, so that the translation becomes time-consuming.

In order to resolve this problem, there is a technique for storing a page table entry used in the translation from a virtual address to a physical address in a page table entry cache called TLB (Translation Lookaside Buffer) within a processor. In this technique, when it becomes necessary to translate the virtual address which is indicated by the same virtual frame, shortly after it was translated once, it suffices to make an access to a TLB which can be made much faster than an access to a real memory.

Next, a case of making an access to data belonging to a virtual frame which is not loaded in a real memory will be described.

Here, the page table entry has an "existence bit", where it indicates that a corresponding page frame is loaded on a real memory when this "existence bit" is 1. On the other hand, when the "existence bit" is 0, it indicates that a corresponding page frame is not loaded on a real memory.

When an access to a page table entry with the "existence bit" set to 0 is made, a page fault occurs and it becomes necessary for the OS to allocate a corresponding page frame and load data on a real memory. In such a case, in the UNIX OS, for example, a position of a corresponding data on a hard disk is specified by referring to a table of i-node, etc.

in a file system, and a necessary amount of data are transferred from the hard disk to the real memory.

Here, in order to learn the position of the data on the hard disk efficiently, an information on a sector number, etc. on the hard disk at which the data are stored can be written into the page table entry, so that the overhead caused by referring to a table of i-node, etc. can be eliminated.

Next, a case of making accesses to resources such as files which are not present in the own computer will be described.

Among the resources such as files which are not present in the own computer, for a part that had transferred through a network in the past from other computer which owns that resource, if cached data is remaining on the real memory, the "existence bit" of the corresponding page table entry is 1, so that an access to this data can be made by making an access to the real memory by using the frame number written in the page table entry.

However, for a part which has not been transferred before, or when cached data is not remaining on the real memory, the "existence bit" of the corresponding page table entry is 0, so that it is necessary to transfer the corresponding part from the computer which owns that resource through a network, and load corresponding data on the real memory.

In such a case, every time an access is to be made to a virtual frame that has not been transferred before, it has conventionally been necessary to identify the computer which owns that resource and request a transfer of the corresponding data, by referring to various tables such as a resource table (which indicates which computer has which resource) and a network routing table (which indicates which path should be taken in order to make a communication with a target computer) to access another computer through a network, so that there has been a problem of a poor efficiency.

Thus, conventionally, in order to realize a data transfer between memory spaces shared among computers in a distributed computer system, it has been necessary to provide a dedicated hardware, and it has been disadvantageous in terms of costs and flexibility of the system configuration.

Moreover, when a plurality of computers are connected by using an existing network, the data transfer becomes time-consuming, and an efficient memory space sharing has been difficult.

SUMMARY OF THE INVENTION

It is therefore an object of the present invention to provide a memory space management method, a data transfer method, and a computer device for a distributed computer system, which are capable of efficiently realizing a high speed data transfer between memory spaces shared among computers, without requiring a complicated and inefficient communication protocol processing at the computer side.

According to one aspect of the present invention there is provided a method of memory space management in a distributed computer system formed by a plurality of computers connected through virtual connections provided by a network, the method comprising the steps of: sharing one region which is at least a part of a virtual memory space/real memory space managed by one computer and another region which is at least a part of a virtual memory space/real memory space managed by another computer; setting up a dedicated virtual connection between said one region and said another region which are shared between said one computer and said another computer at the sharing step; and carrying out a data transfer between said one region and said another region by using the dedicated virtual connection set up at the setting step.

According to another aspect of the present invention there is provided a computer in a distributed computer system formed by a plurality of computers connected through virtual connections provided by a network, the computer comprising: virtual memory space management means for managing a virtual memory space by using a page table which registers a set of a virtual address of the virtual memory space and a corresponding physical address of a real memory space or an information necessary in making an access to a computer which owns data to be accessed; means for commanding a set up of a dedicated virtual connection between shared regions, the shared regions including one region which is at least a part of the virtual memory space managed by the virtual memory space management means and another region which is at least a part of a virtual memory space/real memory space managed by another computer; means for registering a virtual connection identifier of the dedicated virtual connection in an entry of the page table corresponding to said one region, as the information necessary in making an access to a computer which owns data to be accessed; and means for carrying out a data transfer by using the dedicated virtual connection set up between the shared regions, by referring to the virtual connection identifier registered in said entry of the page table before the data transfer between the shared regions is to be carried out, and specifying the dedicated virtual connection to be used for the data transfer according to the virtual connection identifier obtained from the page table.

According to another aspect of the present invention there is provided a computer in a distributed computer system formed by a plurality of computers connected through virtual connections provided by a network, said computer comprising: means for setting up a dedicated virtual connection between shared regions, the shared regions including one region which is at least a part of a real memory space managed by said computer and another region which is at least a part of a virtual memory space/real memory space managed by another computer; and means for carrying out a data transfer by using the dedicated virtual connection set up between the shared regions, when said one region and said another region are shared, or before an actual access to the shared regions is made.

According to another aspect of the present invention there is provided a data transfer method for transferring data between regions of virtual memory spaces shared by different computers in a distributed computer system formed by a plurality of computers connected through virtual connections provided by a network, the method comprising the steps of: sharing one region which is a part of a virtual memory space managed by one computer and another region which is a part of a virtual memory space managed by another computer as shared regions, and allocating a plurality of real memory regions to one of the shared regions in virtual memory spaces; setting up a dedicated virtual connection for the shared regions in virtual memory spaces which are shared at the sharing step; carrying out a data transfer by using the dedicated virtual connection set up at the setting step, between real memory regions which are currently not mapped into the shared regions in virtual memory spaces; and sequentially switching a real memory region which is actually mapped into said one of the shared regions in virtual memory spaces, by sequentially mapping a real memory region for which the data transfer at the carrying out step is completed, into said one of the shared regions in virtual memory spaces.

Other features and advantages of the present invention will become apparent from the following description taken in conjunction with the accompanying drawings.

BRIEF DESCRIPTION OF THE DRAWINGS

FIG. 5 is a diagram showing an exemplary page table used in one embodiment of the present invention.

FIG. 6 is a table summarizing four possible types of sharing scheme that can be used in one embodiment of the present invention.

FIG. 18 is a flow chart of the operation to be carried out in a case of utilizing a name server in one embodiment of the present invention.

DETAILED DESCRIPTION OF THE PREFERRED EMBODIMENTS

Referring now to FIG. 1 to FIG. 18, one embodiment of a memory space management method, a data transfer method, and a computer device for a distributed computer system according to the present invention will be described in detail.

In this embodiment, a distributed computer system is formed by a plurality of computers which mutually share virtual memory spaces and real memory spaces (real memory), where communications among the computers are realized by referring to and/or writing into the shared regions, by utilizing an ATM network.

Figure 1:
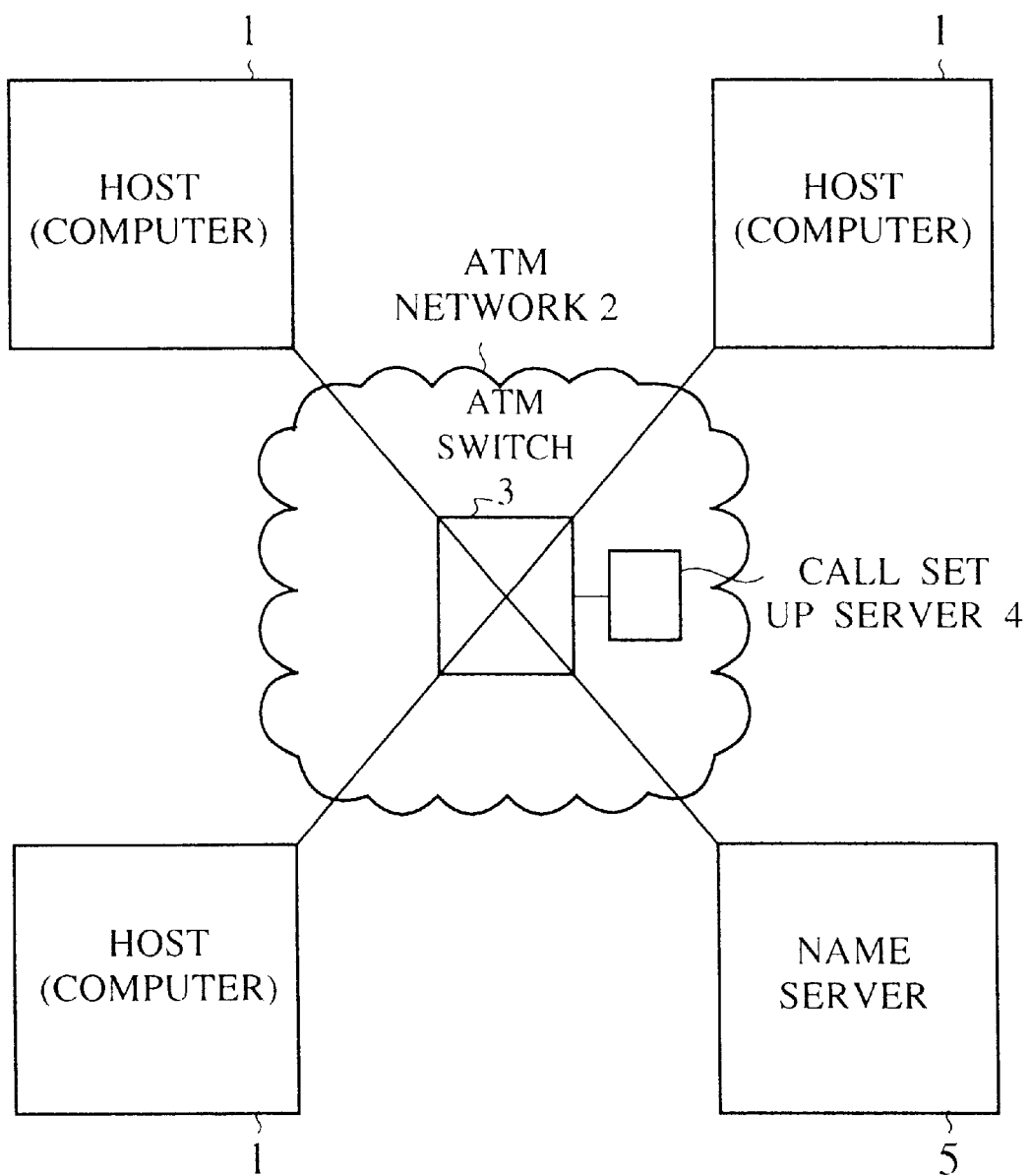
FIG. 1 is a schematic block diagram of an overall configuration of a distributed computer system in one embodiment of the present invention.

FIG. 1 shows an overall configuration of a distributed computer system in this embodiment, in which a plurality of hosts (computers) 1 are connected through an ATM switch 3 of an ATM network 2 to form the distributed computer system. The ATM network 2 is a switch type high speed LAN (Local Area Network). Note that FIG. 1 shows only one ATM switch 3, but in general, a plurality of ATM switches can be provided in the ATM network 2.

In the ATM network 2, a call set up server 4 for controlling a call set up is connected to the ATM switch 3. Note that FIG. 1 shows only one call set up server 4 provided in the ATM network 2, but it is also possible to provide a plurality of call set up servers which share the call set up function in the ATM network 2.

Each host (computer) 1 can set up a connection (virtual connection) with another host (computer) 1 via one or more ATM switch 3.

Each host 1 is a computer which has at least one CPU and memory (real memory) such as RAM, and which has an identifier such as a host address assigned in order to identify it in the network. Each host 1 is also assumed to have a disk device for storing programs, data, files, etc.

As shown in FIG. 1, a name server 5 for managing a correspondence between resources such as files and computers which own these resources may also be connected to the ATM network 2. Note that FIG. 1 shows only one name server 5 connected to the ATM network 2, but it is also possible to provide a plurality of name servers which share the resource management function in the ATM network 2. Note also that the name server 5 may be provided in the host (computer) 1.

Next, with references to FIG. 2 and FIG. 3, a configuration of the computer 1 in the distributed computer system of FIG. 1 will be described.

Figure 2:
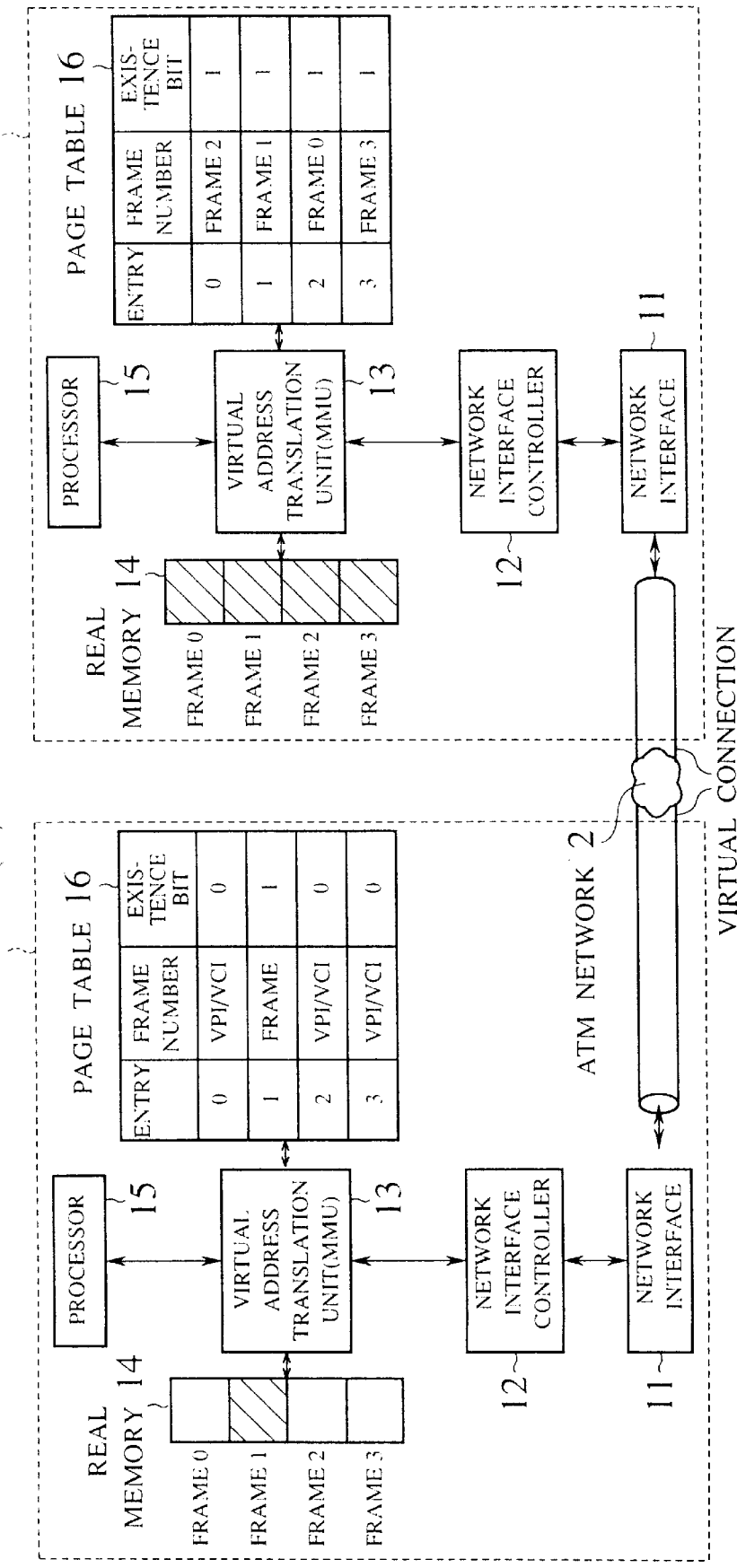
FIG. 2 is a block diagram of a basic configuration of main functions inside each computer in one embodiment of the present invention.

FIG. 2 shows a basic configuration of main functions inside the computer 1 in this embodiment, in a state where two computers 1(A) and 1(B) are connected through a virtual connection of the ATM network 2. Also, FIG. 3 shows an exemplary physical configuration of each computer 1 shown in FIG. 2.

As shown in FIG. 2, the computer 1 has a processor 15, a real memory 14, a page table 16, a virtual address translation unit (MMU: Memory Management Unit) 13 connected with the processor 15, the real memory 14 and the page table 16, a network interface controller 12 connected with the virtual address translation unit 13, and a network interface 11 connected with the network interface controller 12 and the ATM network 2.

The virtual address translation unit 13 refers to the page table 16, and translates a virtual address accessed at a time of execution of a program into a corresponding physical address of data on the real memory 14. Note that the virtual address translation unit 13 is shown as a separate element in FIG. 2 for the sake of explanation, but this virtual address translation unit 13 can be provided as a part of the processor 15 entirely or partially as a separate element outside the processor 15 in the physical configuration.

Figure 3:
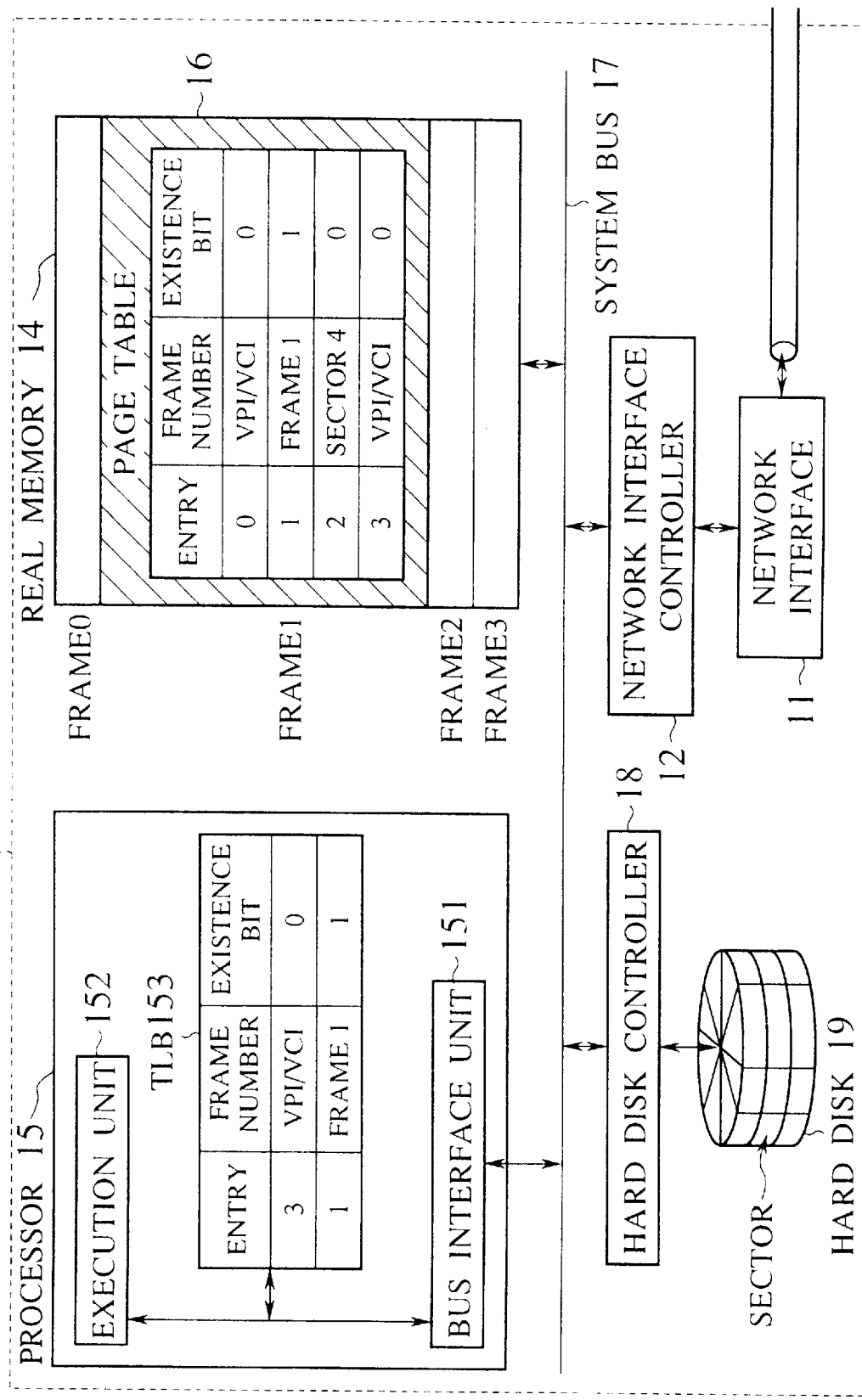
FIG. 3 is a block diagram of an exemplary physical configuration of each computer in one embodiment of the present invention.

In the physical configuration of the computer 1 shown in FIG. 3, the processor 15, the real memory 14 and the network interface controller 12 are connected with each other through a system bus 17, and in addition, a hard disk 19 and a hard disk controller 18 connected with the hard disk 19 and the system bus 17 are also provided. The processor 15 includes a bus interface unit 151 connected with the system bus 17, an execution unit 152 connected with the bus interface unit 151 for executing programs, and a TLB (Translation Lookaside Buffer) 153 connected with the execution unit 152 and the bus interface unit 151. In this physical configuration of FIG. 3, the page table 16 is stored in the real memory 14, and a part of the page table 16 is to be cached into the TLB 153 in the processor 15.

Next, with reference to FIG. 4, the operating system (OS) used in this embodiment will be described.

In the computer 1, the OS necessary in constructing the distributed computer system is implemented. This OS provides a virtual memory space as a scheme for managing an address space in which programs and data are to be arranged.

Figure 4:
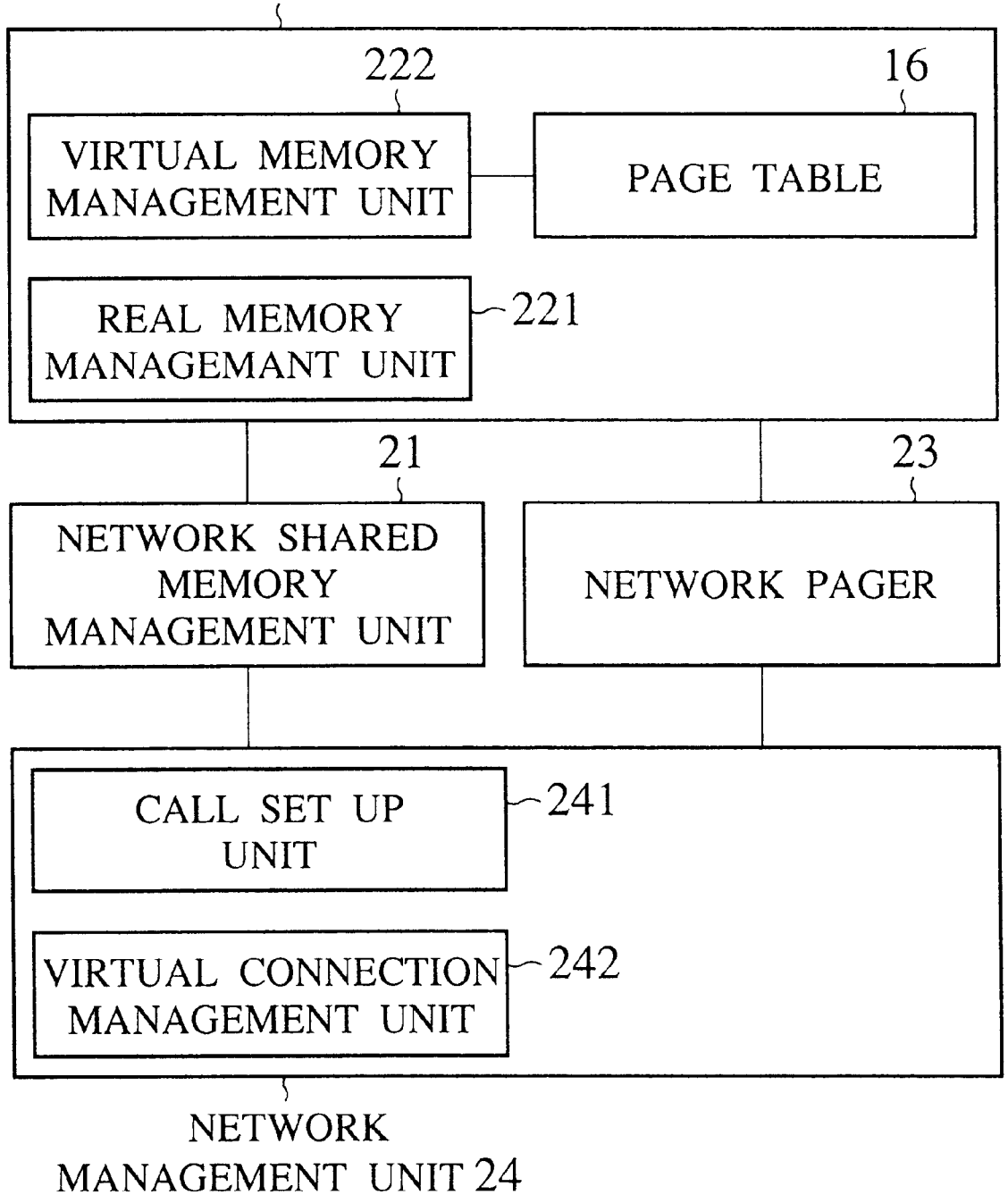
FIG. 4 is a configuration of a main part of an OS in one embodiment of the present invention.

FIG. 4 shows a configuration of a main part of this OS in this embodiment, which comprises a virtual memory space management unit 22, a network management unit 24, a network shared memory management unit 21 connected between the virtual memory space management unit 22 and the network management unit 24, and a network pager 23 connected between the virtual memory space management unit 22 and the network management unit 24. The virtual memory space management unit 22 includes a real memory management unit 221, a virtual memory management unit 222, and the page table 16. The network management unit 24 includes a call set up unit 241 and a virtual connection management unit 242. Note that FIG. 4 only shows a part of the OS which is necessary for the explanation of this embodiment, and the OS actually includes other elements for resource management (thread management, interruption management, device management) which are similar to those of the conventional OS in the virtual memory scheme and therefore omitted in FIG. 4.

The real memory 14 is divided into regions called page frames (which will be abbreviated as frame in the following) where each page frame is in a size of 512 to 8K bytes. In a case of making an access to data existing on the real memory 14, this data is addressed by using a "frame number" of a frame which contains this data and an "offset" indicating a distance from a top of that frame to that data. A corresponding pair of the "frame number" and the "offset" form a "physical address".

On the other hand, in the program, data is addressed by using a "virtual address" which is separately defined in each program, so that at a time of execution of the program, there is a need to translate the "virtual address" into the "physical address".

For this translation of the virtual address into the physical address, the following scheme can be used, for example.

The virtual address is divided into two portions including an upper portion (referred hereafter as "virtual frame") and a lower portion (referred hereafter as "offset"), and the "offset" is directly set as the "offset" of the physical address without any change, while the "virtual frame" is translated into the "frame number" of the physical address by referring to the page table 16 using the "virtual frame" as a key. Namely, a page table entry registering a frame number is registered in advance at an entry point corresponding to a virtual frame in the page table 16, and at a time of translation, the page table entry registered in the entry point corresponding to the virtual frame is referred to read out the frame number registered in this page table entry, so as to obtain the frame number in the real memory which corresponds to the virtual frame.

When a corresponding data does not exist on the real memory, an "existence bit" of the corresponding page table entry is set to 0, and when an access to this page table entry with the "existence bit" set to 0 in the page table 16 is made, a page fault is caused (by a function provided in the processor 15), so that it becomes possible to activate a processing routine which registers a frame number of a page frame into the page table entry when data block belonging to this page frame is transferred from the hard disk to the real memory.

Now, in the conventional OS, in a case of making an access by using a virtual address to a resource belonging to another computer connected through a network such as ATM or Ethernet, the information necessary in using the connection set up with respect to that another computer is not registered in the page table 16, so that it has been necessary to obtain this information by referring to various tables, so that the conventional OS has a poor efficiency in this regard.

In contrast, in the OS of this embodiment, the information on the virtual connection identifier such as VPI/VCI value which is necessary in using the connection set up with respect to another computer is also registered in the page table 16, so that when the page table 16 is referred in order to make an access to a resource belonging to another computer, this information on the virtual connection identifier can be obtained immediately from the page table 16 and therefore a high speed access to a resource belonging to another computer becomes possible.

A procedure for this high speed access to a resource belonging to another computer will be described in detail below, but in short, it is realized as follows.

When the "existence bit" of the page table entry is 1 as a result of referring to the page table entry corresponding to the virtual frame, the page frame corresponding to the virtual frame exists in the real memory 14 on the local host (own host), and the access to the real memory 14 can be made by translating the virtual address into the physical address by using the frame number registered in the page table entry.

On the other hand, when the "existence bit" of the page table entry is 0 but the information such as VPI/VCI value which is necessary in using the connection connected to another computer which owns the resource to be accessed is registered in the page table entry, it is possible to request a transfer of data block which contains data corresponding to the virtual address, to that another computer which owns the resource to be accessed, by using the information registered in the page table entry.

The virtual memory space management unit 22 is basically similar to the conventional one. Namely, the virtual memory space management unit 22 carries out a management of regions in the page table 16, and a setting of parameters in the page table entries of the page table 16 for the purpose of enabling the translation from the virtual address to the physical address by the virtual address translation unit 13.

FIG. 5 shows an example of the page table 16 handled by this virtual memory space management unit 22. In the following, the exemplary configuration of the page table 16 will be described with reference to FIG. 5.

FIG. 5 shows an exemplary case in which the page table 16 stores such information as "entry", "frame number", "existence bit", "processing bit", "hard disk bit", "remote host bit", "thread ID", and "other information" (such as QoS information, etc.). Here, "entry" field registers an index of the page table entry, whose value gives the virtual frame number.

Note here that "frame number", "information necessary in using a connection connected to another computer such as VPI/VCI value" and "sector number on a hard disk" are all stored in the same field (under "frame number" heading in FIG. 5) in this embodiment. The meaning of this "frame number" field is determined according to values stored in the fields of "existence bit", "hard disk bit" and "remote host bit".

The "existence bit" is indicates that a corresponding page frame is loaded on a real memory when it has a value 1, or that a corresponding page frame is not loaded on a real memory when it has a value 0.

The "processing bit" has a value 1 when a preparation of the page frame for the page table entry corresponding to the virtual frame is not yet finished. In other words, a value 1 is set to this "processing bit" in such cases as a case in which the information such as the VPI/VCI value is registered in the page table entry and the data transfer is requested to the computer which owns the resource to be accessed by using the registered VPI/VCI value but the processing is incomplete, or a case in which the data transfer from a disk is still in progress (incomplete). By setting a value 1 in this "processing bit", it is possible to prevent the other programs from making accesses to the same page table entry to doubly request the transfer of the same data.

The "hard disk bit" can be used for the purpose of indicating that a value registered in the "frame number" field of the page table is the sector number of a sector which stores the corresponding data in the hard disk 19.

The "remote host bit" indicates that a value registered in the "frame number" field of the page table is the VPI/VCI value, and will be utilized in a case of requesting the data transfer to the computer which owns the resource to be accessed by using the registered VPI/VCI value.

Note that this "remote host bit" can also be used for the purpose of distinguishing the remote host which owns the data from the name server 5 for searching the remote host, as will be described below.

The network shared memory management unit 21 carries out a management and a setting for the purpose of a sharing of the virtual memory space on the local host (own host) side and the virtual memory space on the remote host side, upon request from a user program, etc.

By means of the function of this network shared memory management unit 21, the distributed computer system can be constructed. In other words, when the shared region is set up by using this function, from a viewpoint of a user or an application program, the virtual memory space which is set up as the shared region appears to be shared with the other hosts so that it becomes possible to utilize the resources of the other hosts by referring to and/or writing into this shared region.

This shared region is a virtual one which is created and managed by the OS and actually realized in the virtual memory space management unit 22 on each host 1. In other words, the hosts 1 possess and manage the respective virtual memory spaces separately, but the network shared memory management unit 21 makes in advance a setting (such as a setting of an identifier of a virtual connection) in the page table entry for the shared region in the virtual memory space management unit 22 which indicates that this region is shared. When an access to this region is actually made, the network pager 23 activated by the virtual memory space management unit 22 carries out a communication with the network pager 23 of the other host to transfer the corresponding data so as to realize the sharing of the virtual memory space.

The network management unit 24 carries out a management of the virtual connections of the ATM network, and handles the network interface controller 12 and the network interface 11.

The network pager 23 is a function for transferring data between regions shared by the computers, which carries out the data transfer by using the virtual connections of the ATM network produced by the network shared memory management unit 21. The client side is activated by the virtual memory space management unit 22, while the server side is activated by the network management unit 24.

Up to here, the outline of the configuration of the distributed computer system in this embodiment has been described.

In the following, the processing carries out in this distributed computer system will be described for the following two operations:

(1) A shared region correspondence management and a virtual connection set up; and (2) A data transfer in shared regions.

The above operation (1) is a processing to set up the shared regions and manage the sharing relationship among a plurality of computers 1. In short, a call set up operation of the ATM scheme is carried out and a virtual connection is connected between the regions in the shared relationship. The identifier of this virtual connection is registered in the page table 16 of the virtual memory space management unit 22 in advance, and will be utilized at a time of the actual data transfer.

The above operation (2) is a processing to carry out the data transfer by using the network pager 23 when an actual access such as read or write with respect to the shared region occurs, so that it becomes necessary to transfer data between sharing computers 1.

Now, there are four possible types of sharing scheme (referred hereafter as Type 1, Type 2, Type 3, and Type 4) as summarized in a table of FIG. 6, depending on whether it is the virtual memory space itself that is to be shared as the shared region or it is the real memory space that is to be shared as the shared region. In the following, these four possible types of sharing scheme will be described one by one.

<Type 1> Type 1 is a scheme in which a region in the virtual memory space on the client side and a region in the virtual memory space on the server side are to be shared by means of a network connection for each shared region. (See FIG. 7 to be described below.)

<Type 2> Type 2 is a scheme in which a region in the virtual memory space on the client side and a region in the real memory space on the server side are to be shared by means of a network connection for each shared region. (See FIG. 13 to be described below.)

<Type 3> Type 3 is a scheme in which a region in the real memory space on the client side and a region in the virtual memory space on the server side are to be shared by means of a network connection for each shared region. (See FIG. 14 to be described below.)

<Type 4> Type 4 is a scheme in which a region in the real memory space on the client side and a region in the real memory space on the server side are to be shared by means of a network connection for each shared region. (See FIG. 15 to be described below.)

Depending on the type of sharing scheme, the OS connects the virtual connection of the ATM scheme between corresponding regions.

<Type 1>

Figure 7:
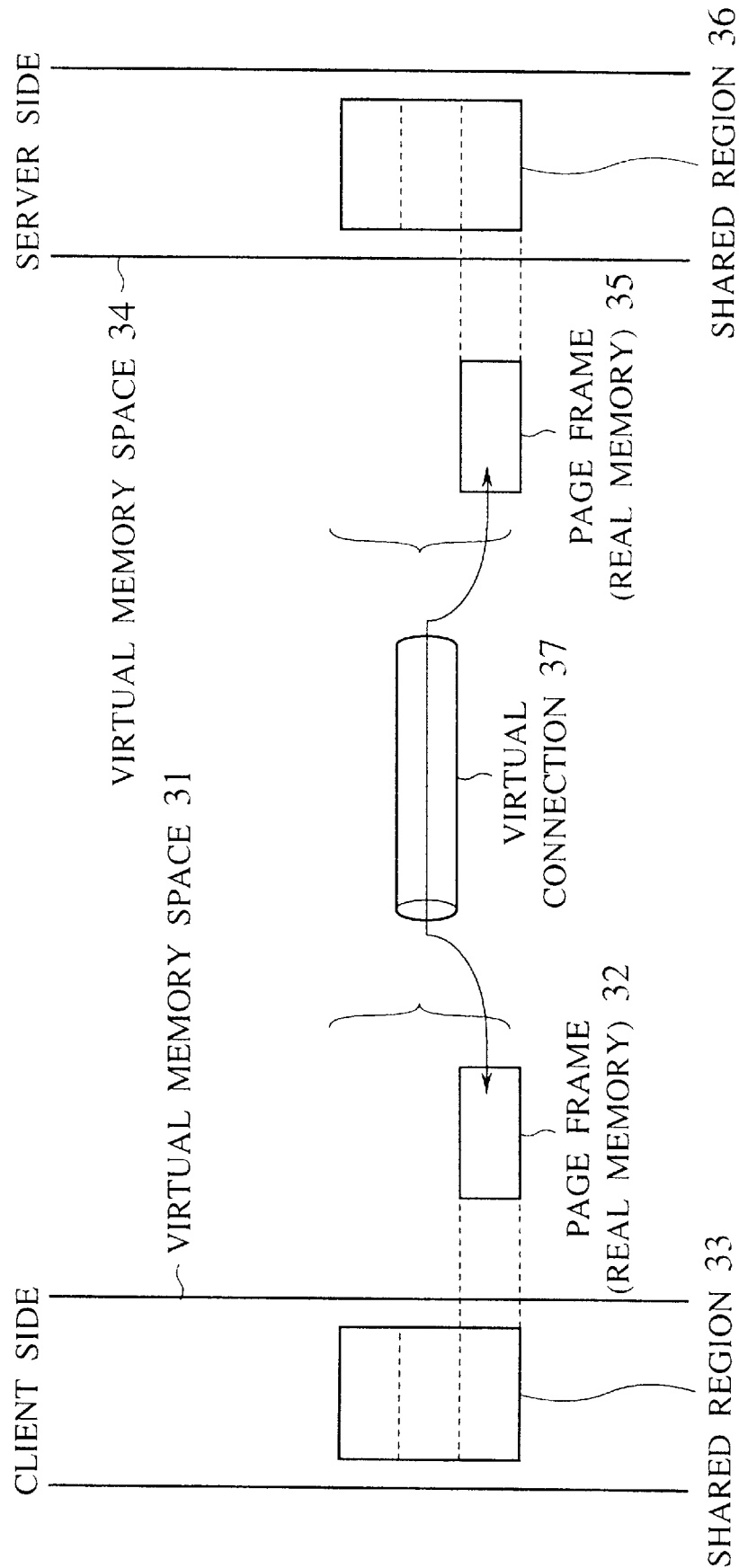
FIG. 7 is a diagram showing an overview of a sharing scheme Type 1 that can be used in one embodiment of the present invention.

First, the processing in a case of Type 1 will be described in detail. FIG. 7 shows an overview of Type 1, where a region 33 in the virtual memory space 31 on the client side and a region 36 in the virtual memory space 34 on the server side are used as the shared regions through a virtual connection 37 connecting a page frame 32 for the shared region 33 on the client side and a page frame 35 for the shared region 36 on the server side.

Figure 8:
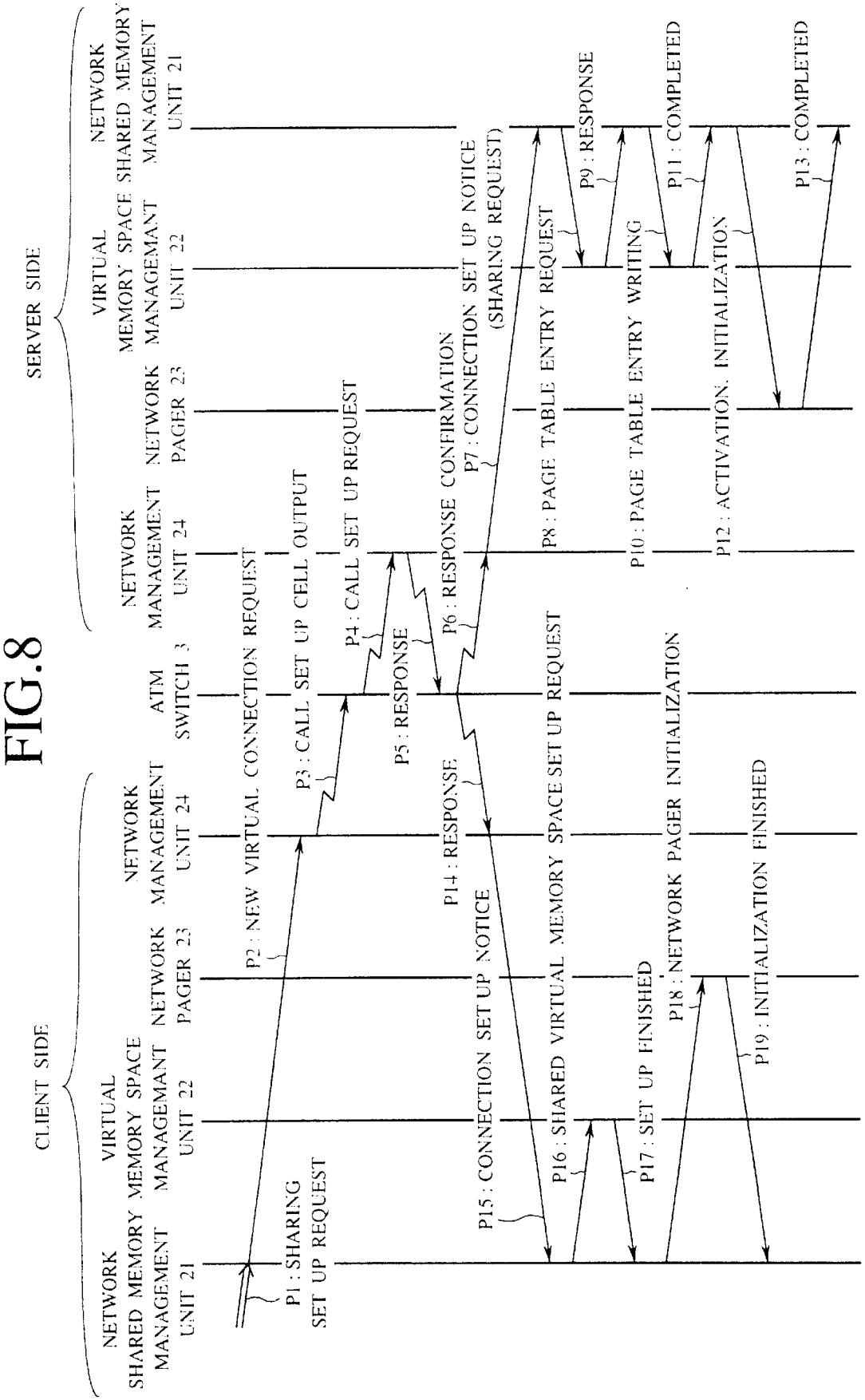
FIG. 8 is a sequence chart for an exemplary virtual connection set up processing for the sharing scheme Type 1.

(1) A Shared Region Correspondence Management and a Virtual Connection Set Up:

First, a set up of a virtual connection in Type 1 will be described. FIG. 8 shows a sequence chart for an exemplary virtual connection set up processing in Type 1.

In Type 1, an unused region in the virtual memory space on the client side and an allocated region (i.e., a region for which a correspondence between the virtual memory space and the resource such as files already exists) in the virtual memory space on the server side are to be shared.

Here, regions to be shared in the virtual memory spaces can be specified by the following scheme, for example.

(i) A user program explicitly specifies regions in the virtual memory spaces of the own computer and the other computer to be set in the sharing relationship between the own computer and the other computer, to the OSs which manage the virtual memory spaces. In this case, the regions to be shared are to be specified before an actual access such as read or write with respect to the shared region occurs.

This scheme corresponds to the OPEN processing in the operation of the file system, in a scheme for utilizing files by mapping files to the virtual memory space (e.g., map system call in the UNIX system). In this case, the name and/or a region of the other computer in the sharing relationship with the own computer can be specified either by a program directly, or by an indication from the name server 5.

(ii) The other computer which is in the sharing relationship with the own computer and a region in the virtual memory space of that other computer are known by the OS in advance (by using a method indicated in a set up file which is referred at a time of bootstrap, or by being incorporated within the OS), and are specified when the first actual access such as read or write with respect to the shared virtual region occurs.

The above schemes (i) and (ii) uses different timings for activating the sharing processing, but they have the same processing procedure, in which the network shared memory management unit 21 on the local (client) side carries out a sharing start procedure with respect to the network shared memory management unit 21 of the computer 1 on the remote (server) side which manages the region of the computer in sharing relationship with the own computer.

In the sequence chart of FIG. 8, when a sharing set up request is entered at the network sharing memory management unit 21 on the client side (P1), a new virtual connection request is sent from the network shared memory management unit 21 to the network management unit 24 on the client side (P2), and a call set up cell is outputted from the network management unit 24 on the client side to the ATM switch 3 (P3). Then, a call set up request is sent from the ATM switch 3 to the network management unit 24 on the server side (P4), and a response is returned from the network management unit 24 to the ATM switch 3 (P5). Then, a response confirmation is sent from the ATM switch 3 to the network management unit 24 on the server side (P6).

Then, on the server side, a connection set up notice (sharing request) is sent from the network management unit 24 to the network shared memory management unit 21 (P7). Then, the page table entry request is sent from the network shared memory management unit 21 to the virtual memory space management unit 22 (P8), and a response is returned from the virtual memory space management unit 22 to the network shared memory management unit 21 (P9). Then, a page table entry writing is made by the network shared memory management unit 21 with respect to the virtual memory space management unit 22 (P10), and a completion of the page table entry writing is notified from the virtual memory space management unit 22 to the network shared memory management unit 21 (P11). Then, the activation and initialization are called from the network shared memory management unit 21 to the network pager 23 (P12), and a completion of the activation and initialization is notified from the network pager 23 to the network shared memory management unit 21 (P13).

On the other hand, on the client side, after P5, a response is returned from the ATM switch 3 to the network management unit 24 (P14), and a connection set up notice is sent from the network management unit 24 to the network shared memory management unit 21 (P15). Then, a shared virtual memory space set up request is sent from the network shared memory management unit 21 to the virtual memory space management unit 22 (P16), and a finishing of the shared virtual memory space set up is notified from the virtual memory space management unit 22 to the network shared memory management unit 21 (P17). Then, a network pager initialization is called from the network shared memory management unit 21 to the network pager 23 (P18), and a finishing of the network pager initialization is notified from the network pager 23 to the network shared memory management unit 21 (P19).

Figure 9:
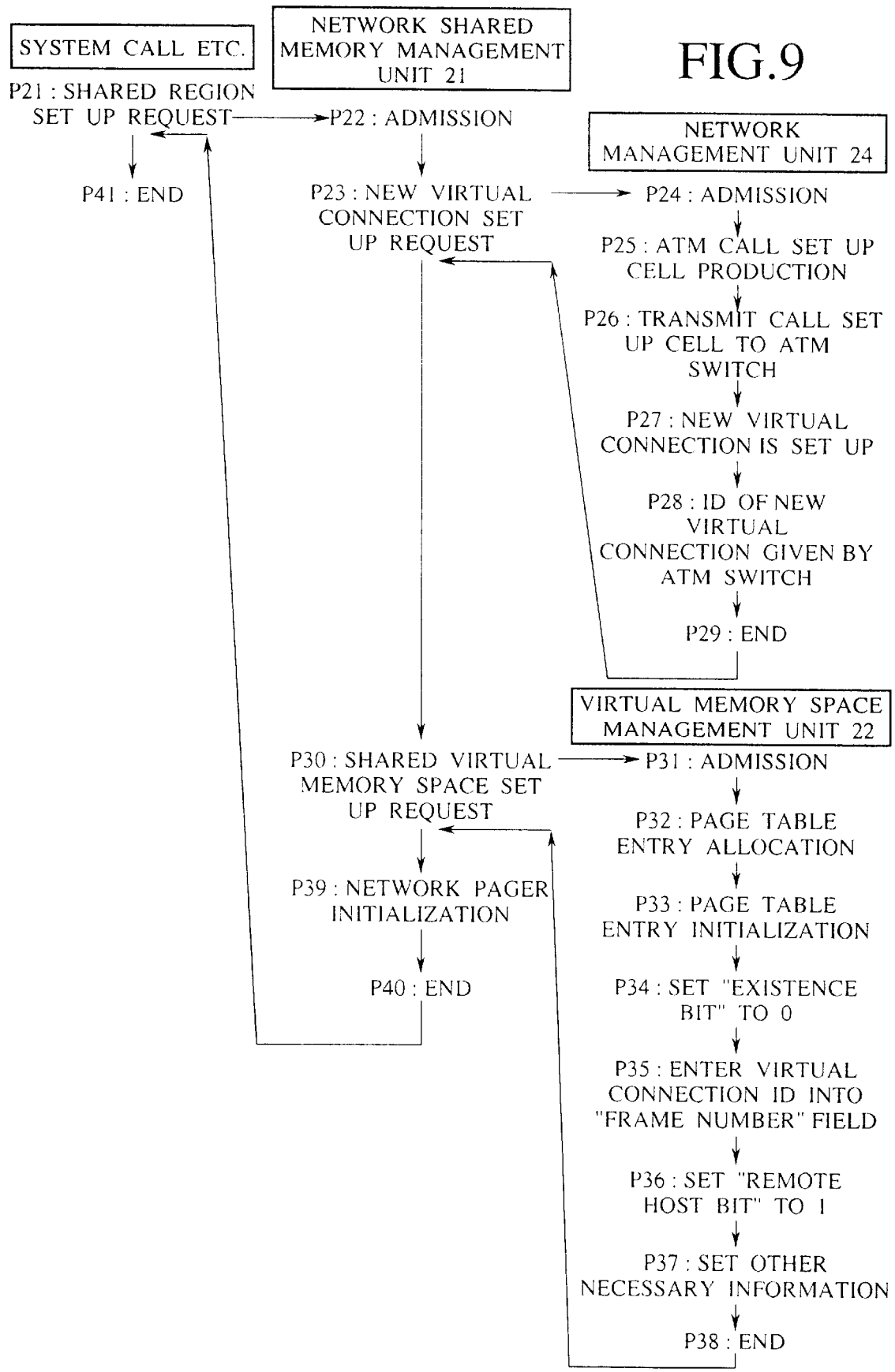
FIG. 9 is a flow chart for the processing on the client side during the virtual connection set up processing in the sharing scheme Type 1.

Next, the processing on the client side will be described in further detail with reference to the flow chart of FIG. 9.

A shared region set up request is sent to the network shared memory management unit 21 by the system call, etc., (P21), and the network shared memory management unit 21 on the client side receives a shared region set up request in the following input format from the system call, etc., by the scheme (i) or (ii) described above (P22).

<Input Format>:

local side virtual memory space ID, start address, size;

remote side host ID, virtual memory space ID, start address;

other information (sharing type, user ID, access control information, QoS information, etc.).

Then, the network shared memory management unit 21 requests the network management unit 24 to set up a new virtual connection with the remote side (P23).

At the network management unit 24 on the client side, when this new virtual connection set up request is received (P24), an ATM call set up cell is produced (P25), and this ATM call set up cell is transmitted to the ATM switch 3 (P26). When a new virtual connection is set up (P27), an identifier such as VPI/VCI which is assigned to this new virtual connection is given from the ATM switch 3 (P28), and the processing at the network management unit 24 is finished (P29).

Next, at the network shared memory management unit 21 on the client side, the identifier of the new virtual connection is obtained as a return value, and using this identifier, a shared virtual memory space set up request in the following input format is sent to the virtual memory space management unit 22 (P30).

<Input Format>:
local side virtual memory space ID, start address, size;
virtual connection identifier;
other information (sharing type, user ID, access control information, QoS information, etc.).

At the virtual memory space management unit 22, when this shared virtual memory space set up request is received (P31), a necessary page table entry is allocated (P32), and the page table entry is initialized (P33), and then parameters are set to the page table entry as follows. First, the "existence bit" is set to 0 (P34), and the identifier such as VPI/VCI value necessary in using the new virtual connection is entered into the "frame number" field of the page table entry (P35). Then, the "remote host bit" is set to 1 (P36), and the other necessary information is set (P37). Then, the processing at the virtual memory space management unit 22 is finished (P38).

Finally, the network shared memory management unit 21 initializes the network pager 23 to be operated at a time of the actual data transfer (P39), and the processing at the network shared memory management unit 21 is finished (P40). This completes the operation initiated by the shared region set up request by the system call, etc. on the client side (P41).

Figure 10:
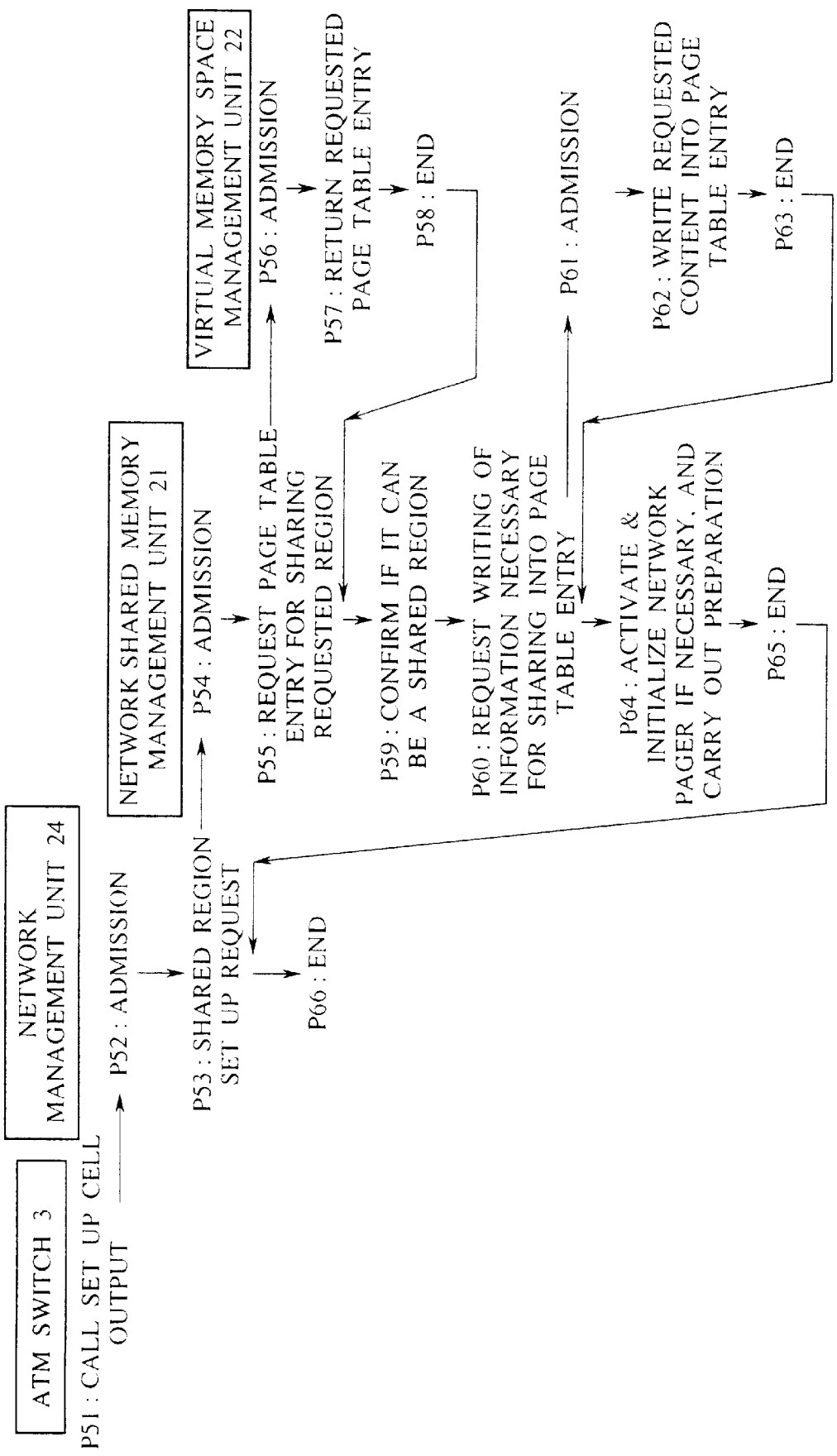
FIG. 10 is a flow chart for the processing on the server side during the virtual connection set up processing in the sharing scheme Type 1.

Next, the processing on the server side will be described in further detail with reference to the flow chart of FIG. 10.

On the server side, when the call set up cell is outputted from the ATM switch 3 (P51), this call set up cell is received at the network management unit 24 (P52). From the information contained in this call set up cell, a region to be shared in the virtual memory space and the client side computer can be authenticated.

Then, by using this information, the network management unit 24 sends a shared region set up request to the network shared memory management unit 21, so as to carry out the sharing processing (P53). At this point, depending on which computer the client side is, the sharing may be refused if necessary.

At the network shared memory management unit 21, when the shared region set up request is received (P54), the page table entry for sharing requested region is requested to the virtual memory space management unit 22 (P55). At the virtual memory space management unit 22, when this request is received (P56), the requested page table entry is returned to the network shared memory management unit 21 (P57), and the processing at the virtual memory space management unit 22 is finished once (P58).

The network shared memory management unit 21 then confirms whether this region can be the shared region, i.e., whether the resource such as files and data are already allocated to this region, by checking the content of the returned page table entry (P59), and then requests the virtual memory space management unit 22 to write the information regarding the sharing into this page table entry, if necessary (P60). At the virtual memory space management unit 22, when this request is received (P61), the requested information is written into this page table entry (P62), and the processing at the virtual memory space management unit 22 is finished again (P63).

Also, the network shared memory management unit 21 activates and initializes the network pager 23 on the server side if it is not yet activated (as in a case where this region is shared for the first time), and carries out various preparation for the data transfer by the network pager 23 using the new virtual connection (P64). Then, the processing at the network shared memory management unit 21 is finished (P65). This completes the operation initiated by the reception of the call set up cell on the server side (P66).

Figure 11:
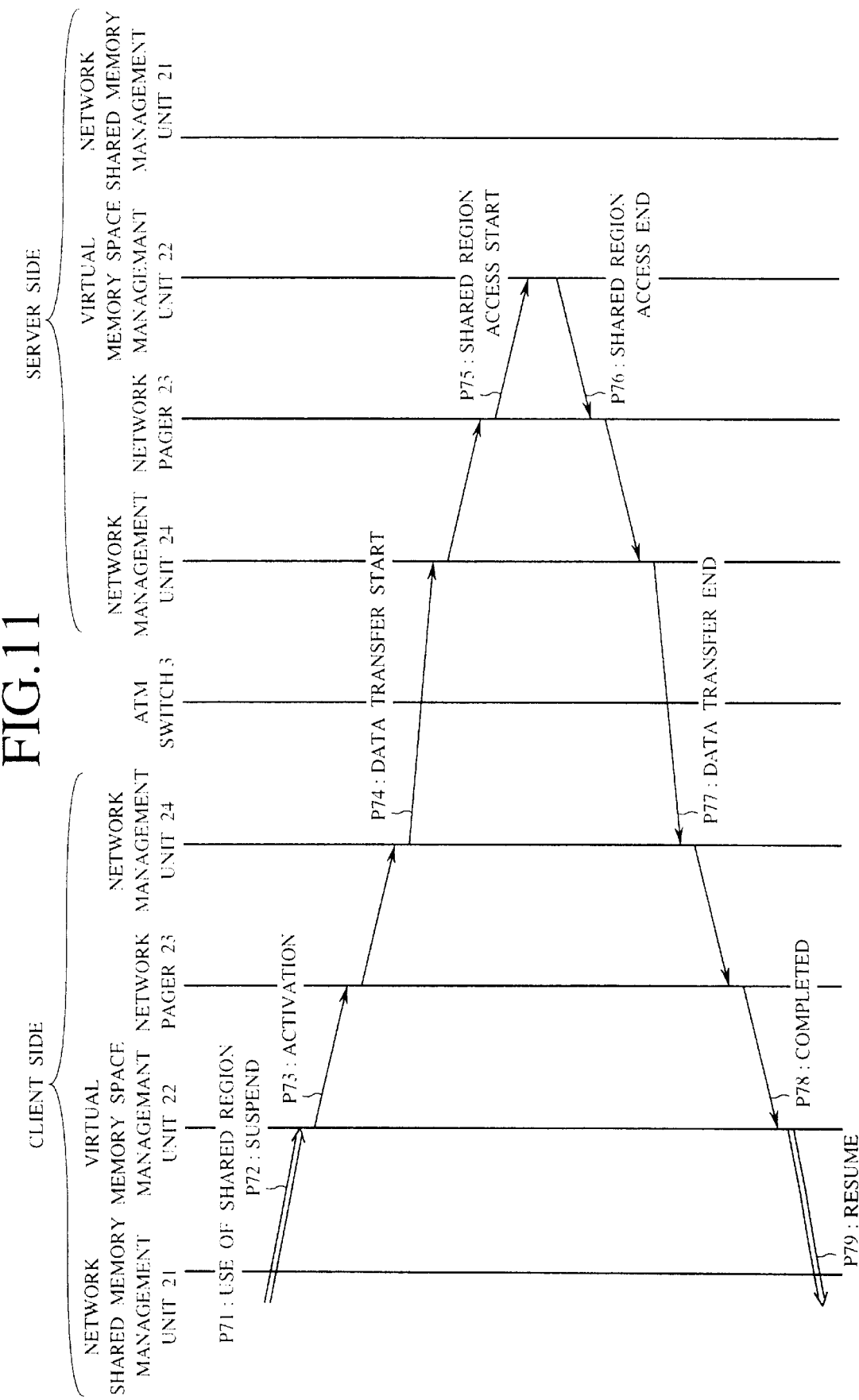
FIG. 11 is a sequence chart for an exemplary data transfer processing for the sharing scheme Type 1.

(2) A Data Transfer in Shared Regions:

Next, the data transfer in the shared regions in Type 1 will be described. FIG. 11 shows a sequence chart for an exemplary data transfer processing in Type 1.

In the sequence chart of FIG. 11, when a use of the shared region is made (P71), the execution of the program on the client side is suspended (P72), and the virtual memory space management unit 22 activates the network pager 23 (P73). Then, the data transfer is started between the network pagers 23 on the client side and the server side, via the network management units 24 on the client side and the server side (P74). Then, the access to the shared region in the virtual memory space management unit 22 is started by the network pager 23 on the server side (P75). When the access to the shared region in the virtual memory space management unit 22 is finished (P76), the data transfer between the network pagers 23 on the client side and the server side is ended (P77), and the completion of the data transfer is notified from the network pager 23 to the virtual memory space management unit 22 on the client side (P78). Then, the execution of the program on the client side is resumed (P79).

Figure 12A:
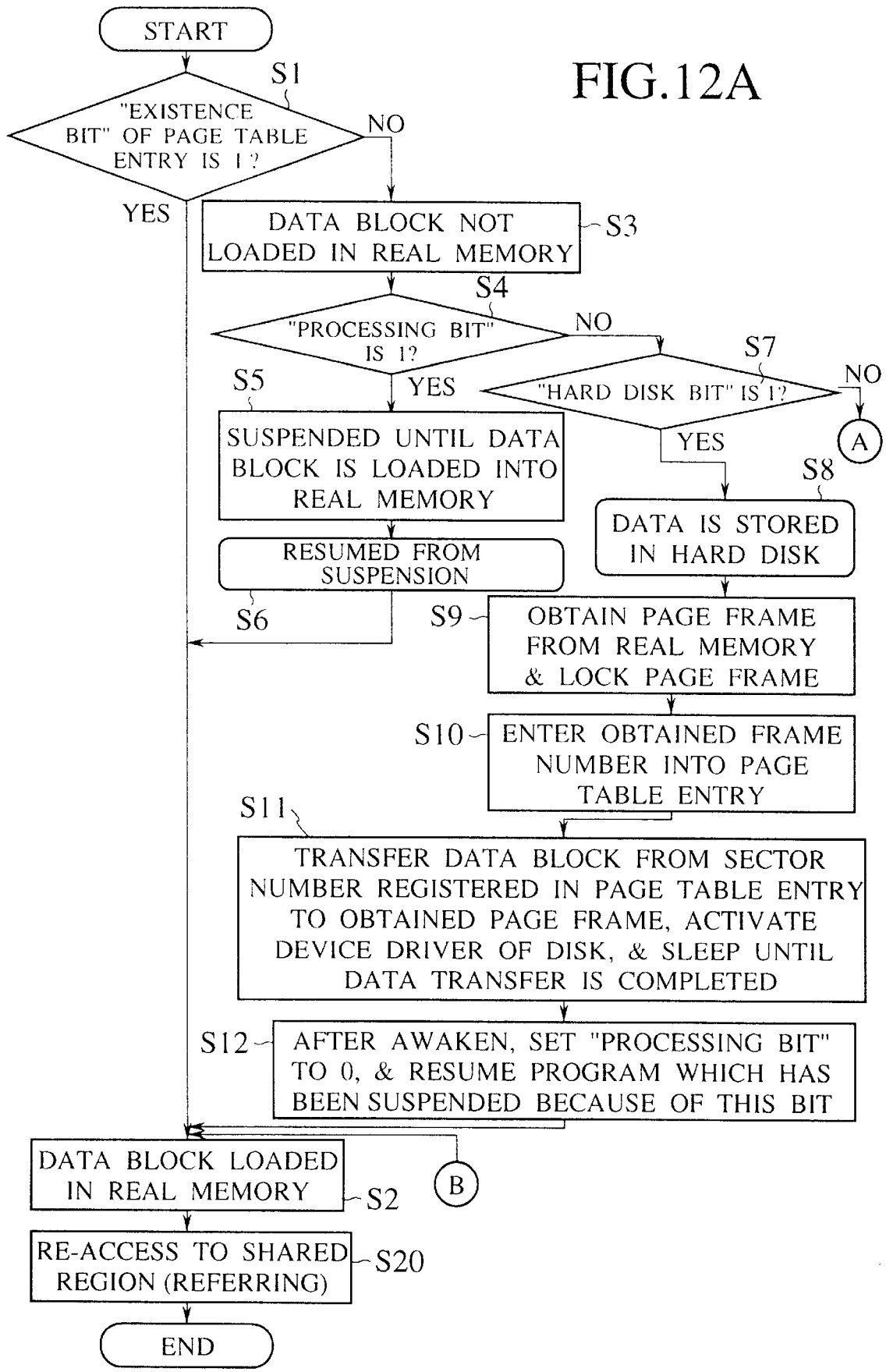
FIGS. 12A and 12B are a flow chart of an exemplary operation at a time of executing the access to the virtual memory space in the sharing scheme Type 1.
Figure 12B:
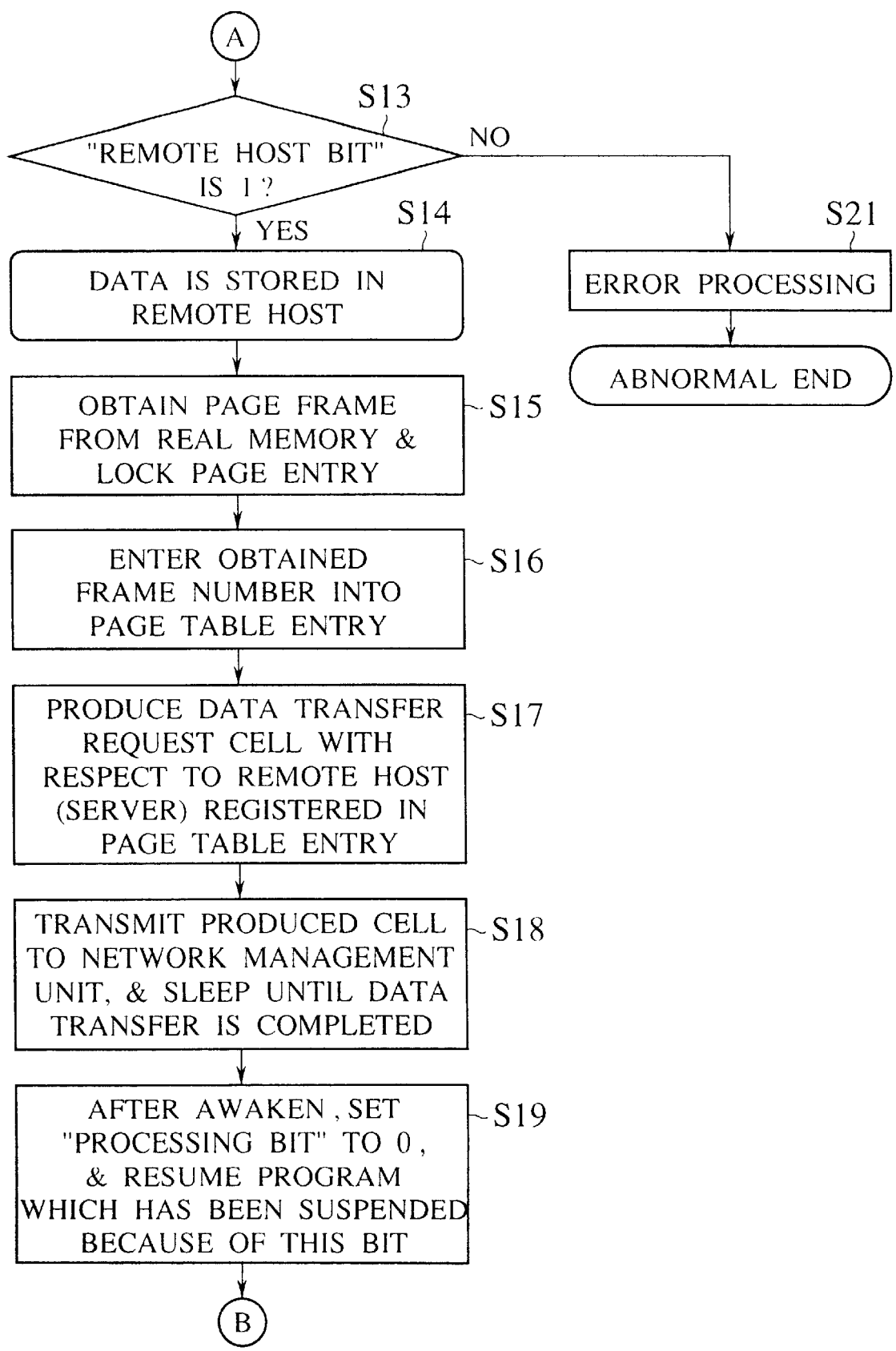

FIG. 12A and FIG. 12B show a flow chart of an exemplary operation at a time of executing the access to the virtual memory space in Type 1.

At a time of making an access (read or write) to the data indicated by the virtual address, the page table 16 is to be referred in order to translate the virtual address to the physical address, and here, when the "existence bit" in the page table entry corresponding to the virtual frame is 1 (step S1 YES), it implies that the corresponding data block is loaded in the real memory 14 (step S2), so that the "frame number" registered in the page table entry is used to calculate the physical address, and an access to the real memory 14 is made by using the calculated physical address, so as to make an access to the desired data (step S20).

When the "existence bit" is 0 (step S1 NO), it implies that the corresponding data block is not loaded in the real memory 14 (step S3). In this case, when the "processing bit" is 1 (step S1 NO, step S4 YES), it implies that the other process, etc. is making an access to the same page frame, and the pager processing, etc. managed by the OS is in a middle of the processing for transferring the data corresponding to this page frame to the real memory 14, so that the execution of this program is suspended until the end of the pager processing by the OS, i.e., until the data block is loaded into the real memory 14 (step S5).

When the pager processing by the OS is finished, the pager of the OS sets "processing bit" of the corresponding page table entry to 0, and resumes the execution of the program which has been suspended.

When resumed from the suspension (step S6), the "frame number" newly registered in the page table entry is used to calculate the physical address, and an access to the real memory 14 is made by using the calculated physical address, so as to make an access to the desired data (step S20).

When the "existence bit" is 0 (step S1 NO) and the "processing bit" is 0 (step S4 NO), but the "hard disk bit" is 1 (step S7 YES), it implies that this data is stored in the hard disk 19, and the "frame number" field of the page table entry corresponding to the virtual frame registers the sector number on the hard disk 19 corresponding to that virtual frame (step S8). This state occurs when a capacity of the real memory 14 is in shortage so that the content of the page frame corresponding to this virtual frame is to be temporarily saved into the hard disk 19 in order to release this page frame (as in a case of the swap out or the page out), for example.

This processing is called the pager processing, which is carried out as follows. First, the page frame necessary in storing this data is obtained from the real memory 14, and this page frame is locked so as not to be used by the other process, etc. (step S9). Then, the obtained frame number is entered into the "frame number" field in the page table entry, and the "hard disk bit" is set to 0 while the "existence bit" and the "processing bit" are set to 1 in this page table entry (step S10).

Then, using the sector number registered in the page table entry, the corresponding data block is read out from the hard disk 19, and transferred to the obtained page frame. Here, the device driver of the disk which carries out the actual data transfer is activated, and then this pager processing is put into sleep until the data transfer is completed (step S11).

When the processing by the device driver is completed, this pager processing is awaken by the OS, and re-started. Here, the "processing bit" of the corresponding page table entry is set to 0, and the execution of the program which has been suspended because of the value 1 that has been indicated by this "processing bit" is resumed (step S12).

At this point, the data block is loaded in the real memory 14 (step S2), so that the "frame number" newly registered in the page table entry is used to calculate the physical address, and an access to the real memory 14 is made by using the calculated physical address, so as to make an access to the desired data (step S20).

When the "existence bit" is 0 (step S1 NO), the "processing bit" is 0 (step S4 NO), and the "hard disk bit" is 0 (step S7 NO), but the "remote host bit" is 1 (step S13 YES), it implies that this data is stored in the remote host (step S14), and the pager processing is carried out as follows. In this case, the "frame number" field of the page table entry corresponding to the virtual frame registers the information on the identifier of the virtual connection such as the VPI/VCI value which is necessary for a communication with the server computer which owns the resource corresponding to the virtual frame, as set by the sharing processing (1) described above. Consequently, the page frame necessary in storing this data is obtained from the real memory 14, and this page frame is locked so as not to be used by the other process, etc. (step S15). Then, the obtained frame number is entered into the "frame number" field in the page table entry, and the "remote host bit" is set to 0 while the "existence bit" and the "processing bit" are set to 1 in this page table entry (step S16).

Then, using the virtual connection identifier information such as the VPI/VCI value registered in the page table entry, the network pager 23 on the client side (local side) is activated and the data transfer is requested, by producing a data transfer request cell with respect to the remote host (server) registered in the page table entry (step S17), and transmitting the produced data transfer request cell to the network management unit 24 (step S18). Then, this pager processing is put into sleep until the data transfer is completed.

At the network pager 23 on the client side, a cell for requesting the transfer of the data block is produced and transmitted to the network pager 23 of the remote side computer through the network management unit 24, using the specified virtual connection identifier. Here, the cell for requesting the transfer of the data block includes the following content: start address, size, data transfer direction (client→server, or server→client), other information (sharing type, user ID, etc.).

After that, when the data cell in response to this request cell is received, the network pager 23 on the client side registers the content of this data cell into the corresponding page frame.

When the processing by the network pager 23 is completed, this pager processing is awaken by the OS, and re-started. Here, the "processing bit" of the corresponding page table entry is set to 0, and the execution of the program which has been suspended because of the value 1 that has been indicated by this "processing bit" is resumed (step S19).

At this point, the data block is loaded in the real memory 14 (step S2), so that the "frame number" newly registered in the page table entry is used to calculate the physical address, and an access to the real memory 14 is made by using the calculated physical address, so as to make an access to the desired data (step S20).

When the "existence bit" is 0 (step S1 NO), the "processing bit" is 0 (step S4 NO), the "hard disk bit" is 0 (step S7 NO), and the "remote host bit" is 0 (step S13 NO), the error processing is carried out (step S21).

At the network management unit 24 on the remote side computer, when the data transfer request cell described above is received, the network management unit 24 identifies the network pager 23 on the server side which is responsible for the virtual connection identified by the virtual connection identifier indicated by that request cell, and notifies the content of that request cell to the identified network pager 23 on the server side.

At the network pager 23 on the server side, when the content of the request cell is notified, the data block in the specified size is read out starting from the specified start address in the virtual memory space, and entered into a cell, and then this cell is sent to the client side by using the same virtual connection.

Here, it is assumed that the data to be transferred is processed by an appropriate transport protocol such as AAL5 on ATM network (including ATM switch and ATM interface controller). This transport protocol guarantees the completeness of the data between the network pagers 23 on both sides, by detecting data content sequence order, missing data, and data content error, and carrying out the data re-transmission if necessary. Note that the data is already processed to some extent at the ATM network side, so that the processing at the computer side (including OS and network protocol processing programs) is light.

In the above, the operation in a case where the client side refers to the data in the shared virtual memory space has been described, but in a case where the write access occurs at the client side, the data transfer direction between the network pagers 23 is to be reversed.

Now, based on the above description, the main processings at each unit on the client side and the server side will be summarized.

[1] Network Shared Memory Management Unit 21 (client side):

This unit receives the sharing set up request.

This unit requests the network management unit 24 to set up the virtual connection with the server side computer to be in the sharing relationship with this client side computer.

This unit sets the virtual connection identifier, etc. into the corresponding page table entry of the page table managed by the virtual memory space management unit 22.

[2] Network Management Unit 24 (client side):

This unit sets up a new virtual connection by carrying out a call set up with the ATM switch 3.

This unit notifies the utilization purpose of this virtual connection to the server side computer at a time of connection request, by utilizing the additional information function (usr-usr information in the call set up cell, usr-usr message cell that can be exchanged between end-to-end hosts at a time of call set up, etc.) at a time of the call set up in the ATM scheme. This virtual connection is dedicated for use by the data transfer for this shared region.

This unit carries out the flow control, the error detection, the congestion control, etc. for this virtual connection.

[3] Network Pager 23 (client side):

This unit is called up from the virtual memory space management unit 22 when there is an actual data transfer request.

This unit obtains the real memory in a necessary size according to a type of access (read or write) to the virtual memory space and its address, and requests a start position of the virtual address, a size, etc. which are necessary for the data transfer, to the server side computer.

In a case of read, the data are transmitted from the server side computer, so that the received data is stored in the real memory 14.

In a case of write, after the transfer request cell is transmitted, the data is entered into a cell and this cell is transmitted.

[4] Network Management Unit 24 (server side):

This unit receives the call set up cell from the ATM switch 3, and sets up a new virtual connection.

This unit learns the utilization purpose of this new virtual connection from the additional information at a time of the call set up, and when it is a new virtual connection for the network shared region, the control is shifted to the network shared memory management unit 21 (server side).

Thereafter, when the transfer request cell is received, the control is shifted to the network pager 23 which is responsible for this virtual connection.

This unit carries out the flow control, the error detection, the congestion control, etc. for this virtual connection.

[5] Network Shared Memory Management Unit 21 (server side):

This unit calls a new virtual memory space sharing request from the network management unit 24.

This unit carries out the initial setting by communicating with the network shared memory management unit 21 on the client side by utilizing the new virtual connection. In other words, a virtual memory space ID, a start position of the virtual address, a size, etc. on the server side are notified. This unit notifies these information to the virtual memory space management unit 22, and checks whether it is possible to share the requested region.

This unit activates the network pager 23 which is responsible for this shared region, and notifies the obtained virtual connection identifier.

Thereafter, whenever there is a read request or a write request from the virtual connection, this unit carries out the data read/write operation with respect to the region at the virtual address corresponding to the request.

[6] Network Pager 23 (server side):

This unit is called up from the network management unit 24 when there is an actual data transfer request.

A data transfer direction (read or write) for the corresponding region in the virtual memory space, as well as a start position of the virtual address, a size, etc. for the data transfer are notified from the client side computer to this unit.

In a case of read, the data block is read out from the virtual memory space, entered into a cell, and then transmitted to the client side computer.

In a case of write, the transfer request cell is received, and the data in the cell received thereafter is entered into the corresponding region, which is in the size specified by the transfer request cell and starting from the start address specified by the transfer request cell.

As described above, according to this embodiment, in the distributed computer system in which a plurality of computers are connected through an ATM network, a part of the virtual space or the real memory space (real memory) is shared and the direct high speed data transfer can be carried out by utilizing the dedicated ATM virtual connection that has been set up for each shared region. Consequently, it is possible to realize an efficient memory space sharing without requiring a complicated and inefficient communication protocol processing at the computer side. Thus, there is no need for a call set up every time the referring or the writing (read or write) with respect to the shared space occurs, and the data transfer can be carried out immediately.

Also, the control during the data transfer such as the call set up, the error detection, the congestion control, etc. can be largely handled at the ATM switch side, so that it suffices for the computer side to manage only the part which is insufficient for its function (such as the correction or the re-transmission in a case of the data error, for example), and therefore the processing on the computer side can be reduced considerably.

In addition, by utilizing the ATM switch, it is possible to construct the distributed computer system by connecting the computers which are distanced from each other to some extent, so that the configuration can be highly flexible.

Also, in a case of making an access to the resource belonging to another computer, the virtual connection identifier (VPI/VCI value, etc.) which is necessary in using the connection to that another computer can be obtained, by simply referring to the page table which is used at a time of translating the virtual address to the physical address.

For this reason, in a case of requesting the transfer of the data block in the necessary size among the resources belonging to that another computer, the request cell can be produced by using the virtual connection identifier obtained from the page table, without referring to various tables as in a conventional case, so that the request cell can be produced efficiently.

Note that, in a case of the OS in the single virtual memory space scheme, there is only one virtual memory space exists for each computer. Consequently, in such a case, it is also possible to realize a configuration in which the entire virtual memory space of each computer is shared so that the virtual memory space can be utilized equally by any computer. In such a case, instead of making the entire virtual memory space as a single shared region, it is also possible to divide the virtual memory space into a plurality of shared regions, and carry out the sharing processing to each divided shared region separately.

<Type 2>

Next, the processing in a case of Type 2 will be described in detail.

In Type 1 described above, the shared regions are the virtual memory spaces of the computers, but in this Type 2, a region in the virtual memory space on the client side and a region in the real memory space (real memory) on the server side are to be shared.

Figure 13:
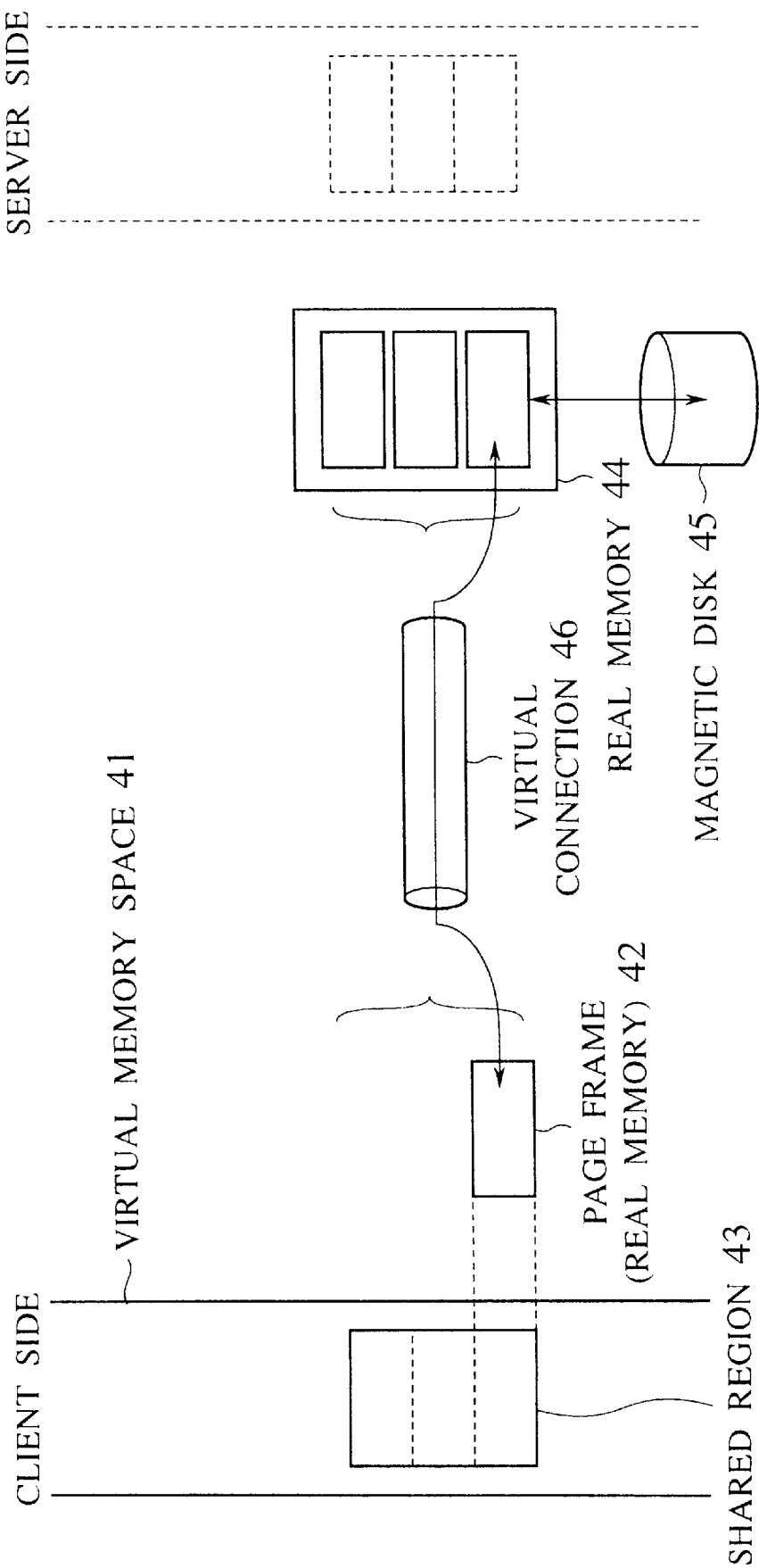
FIG. 13 is a diagram showing an overview of a sharing scheme Type 2 that can be used in one embodiment of the present invention.

FIG. 13 shows an overview of Type 2, where a region 43 in the virtual memory space 41 on the client side and a region in the real memory 44 connected with a magnetic disk 45 on the server side are used as the shared regions through a virtual connection 37 connecting a page frame 42 for the shared region 43 on the client side and the shared region of the real memory 44 on the server side.

This Type 2 is suitable for a case in which the data block exists on the server side but this data block is not yet utilized by the program, etc. on the server side, so that this data block has not been allocated to the virtual memory space, or a case in which the server side has no program for utilizing this data block and only manages this data block, for example. In other words, this Type 2 assumes the utilization of the shared space only from the client side and not from the server side. In this case, the data block is stored as a permanent file, etc., in the magnetic disk 45 of the server side computer.

In Type 2, a procedure to set up the virtual connection for the shared regions is almost identical to that of Type 1, except for the following. Namely, in specifying the shared region on the server side, instead of "virtual memory space ID, start address, size" used in Type 1, "start address of the real memory, size" are used in Type 2.

Note, however, that the real memory is usually allocated to the virtual memory space temporarily and utilized as a buffer for temporarily storing the disk content (data block) at the server side, according to the real memory management scheme in the general OS such as UNIX. Consequently, in a case of the general OS, it is not practical to directly specify the address of the real memory explicitly at a time of the call set up. For this reason, the data block (i.e., the permanent file) is directly specified by a file name, instead of the address of real memory, and the server side obtains a position on the magnetic disk 45 which stores the data block from the specified file name, using the name server 5 or the file system. Then, the server side obtains the real memory 44 in a necessary size, reads out the stored content from the magnetic disk 45, and transfers the read out content to the real memory 44. The regions of this real memory 44 are then managed as the shared regions by the network pager 23 on the server side.

As for the data transfer in conjunction with the read/write of the shared region on the client side, the procedure is similar to that of Type 1 described above.

In this Type 2, the real memory is set in correspondence to the virtual memory space at the server side, and there is no need for the page fault processing. Also, the data are transferred from the disk, etc. to the real memory on the server side in advance, so that the high speed data transfer through the virtual connection to the client side can be realized.

<Type 3>

Next, the processing in a case of Type 3 will be described in detail.

In Type 1 described above, the shared regions are the virtual memory spaces of the computers, but in this Type 3, a region in the real memory space on the client side and a region in the virtual memory space on the server side are to be shared. Then, when the sharing start processing is completed or before the program, etc. makes an access to the shared region, the data transfer is to be carried out in advance.

Figure 14:
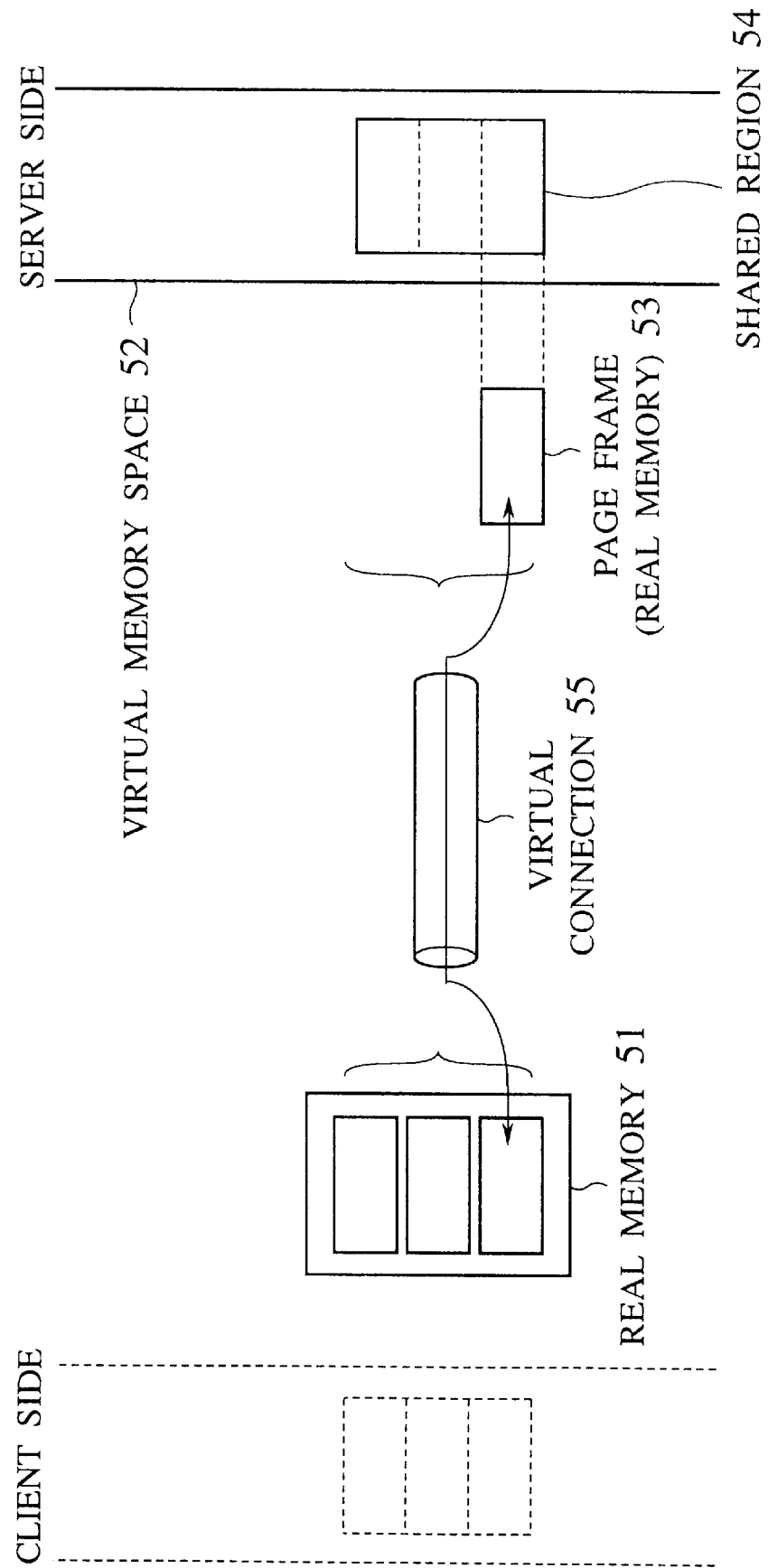
FIG. 14 is a diagram showing an overview of a sharing scheme Type 3 that can be used in one embodiment of the present invention.

FIG. 14 shows an overview of Type 3, where a region in the real memory 51 on the client side and a region 54 in the virtual memory space 52 on the server side are used as the shared regions through a virtual connection 55 connecting the shared region of the real memory 51 on the client side and a page frame 53 for the shared region 54 on the server side.

(1) A Shared Region Correspondence Management and a Virtual Connection Set Up:

A procedure to set up the virtual connection in Type 3 is similar to that of Type 1 described above.

First, the processing on the client (local) side will be described.

The network shared memory management unit 21 on the client side carries out a sharing start processing with respect to the network shared memory management unit 21 of the computer which manages the remote region to be shared. In Type 1, a part of the virtual memory space is specified by a scheme for specifying the shared region on the client side. Similarly, in Type 3, a region in the virtual memory space on the client side rather than that in the real memory can be specified. In this case, the shared region is specified by the following input format similar to that used in Type 1.

<Input Format>:

local side virtual memory space ID, start address, size;

remote side host ID, virtual memory space ID, start address;

other information (sharing type, user ID, access control information, QoS information, etc.).

In this case, the virtual memory space management unit 22 on the client side obtains the real memory in the same size as the specified region in the virtual memory space, and utilizes it for the shared region.

As an alternative scheme, the real memory can be obtained independently from the virtual memory space on the client side. In this case, the real memory in a size necessary for the shared region is directly obtained in advance. In this scheme, the request is made to the real memory management unit 211 in the virtual memory space management unit 22 by utilizing the system call, etc. provided by the OS on the client side.

The sharing is specified by using the following input format.

<Input Format>:

local side real memory start address, size;

remote side host ID, virtual memory space ID, start address;

other information (sharing type, user ID, access control information, QoS information, etc.).

In this case, the user program, etc. on the client side utilizes the data by directly specifying the address of the real memory (by utilizing the system call, etc. for making an access to the data by specifying the address of the real memory which is provided by the OS). Else, the real memory is utilized by mapping it onto a virtual memory space.

Then, the network shared memory management unit 21 receives the data in the above input format by the system call, etc., and requests the network management unit 24 to set up a new virtual connection with the remote side.

At the network management unit 24 on the client side, an ATM call set up cell is produced, and this ATM call set up cell is transmitted to the ATM switch. When a new virtual connection is set up, an identifier such as VPI/VCI value which is assigned to this new virtual connection is obtained.

Next, at the network shared memory management unit 21 on the client side, the network pager 23 to be operated at a time of the actual data transfer is initialized. The identifier of the new virtual connection obtained at the network management unit 24 is received as a return value, and a start of the data transfer is requested by notifying the identifier of the new virtual connection to the network pager 23.

This completes the processing on the client side at a time of sharing start.

Next, the processing on the server (remote) side will be described.

On the server side, the call set up cell from the ATM switch 3 is received at the network management unit 24. From the information contained in this call set up cell, a region to be shared in the virtual memory space and the client side computer can be ascertained.

Then, this information is sent to the network shared memory management unit 21 on the server side, so as to carry out the sharing processing. At this point, depending on which computer the client side is, the sharing may be refused if necessary.

At the network shared memory management unit 21, the content of the page table entry for sharing requested region is checked to confirm whether the resource such as files and data are already allocated to this region, and the information regarding the sharing is set into this page table entry, if necessary.

Also, the network shared memory management unit 21 activates the network pager 23 on the server side, and carries out various preparation for the data transfer by the network pager 23 using the new virtual connection.

(2) A Data Transfer in Shared Regions:

Next, the data transfer in the shared regions in Type 3 will be described.

Unlike Type 1, the real memory is already allocated to the shared region on the client side in Type 3, so that even when the program, etc. makes an access to this region, the page fault is not caused.

In a case of Type 3, the data transfer is carried out immediately after the virtual connection set up described above (independently from an access on the client side), instead of carrying out the data transfer when an actual access occurs on the client side as in Type 1.

First, the data is transferred form the server side to the client side at a time of the virtual connection set up, and the preparation for referring access is completed on the client side.

Then, when there is a write access on the client side, the data transfer to the server side is carried out by the separate means (executing the data transfer by the system call, or executing the data transfer regularly, or executing the data transfer at a time of shared region release, etc.).

At the network pager 23 on the client side, a cell for requesting the transfer of the data block is produced and transmitted to the network pager 23 of the remote side computer through the network management unit 24, using the specified virtual connection identifier.

Here, the cell for requesting the transfer of the data block includes the following content: start address, size, data transfer direction (client→server, or server→client), other information (sharing type, user ID, etc.).

After that, when the data cell in response to this request cell is received, the network pager 23 on the client side registers the content of this data cell into the corresponding real memory (page frame).

When this registration is completed, the data transfer with respect to the server side is subsequently carried out according to a command from the separate means (executing the data transfer by the system call, or executing the data transfer regularly, or executing the data transfer at a time of shared region release, etc.).

At the network management unit 24 on the remote side computer, when the data transfer request cell described above is received, the network management unit 24 identifies the network pager 23 on the server side which is responsible for the virtual connection identified by the virtual connection identifier indicated by that request cell, and notifies the content of that request cell to the identified network pager 23 on the server side.

At the network pager 23 on the server side, when the content of the request cell is notified, the data block in the specified size is read out starting from the specified start address in the virtual memory space, and entered into a cell, and then this cell is sent to the client side by using the same virtual connection.

In Type 3, it is possible to set up a plurality of page frames (real memory) as a single shared region on the client side in advance. On the client side, the real memory which is the shared region is utilized by mapping it onto the virtual memory space, and when an access to the virtual memory space is made by the user program, etc., the page fault does not occur because the real memory is already allocated, so that the page fault processing is unnecessary and the data can be accessed immediately. Consequently, it is possible to realize the high speed user program execution.

Here, it is assumed that the data to be transferred is processed by an appropriate transport protocol such as AAL5 on ATM network (including ATM switch and ATM interface controller). This transport protocol guarantees the completeness of the data between the network pagers 23 on both sides, by detecting data content sequence order, missing data, and data content error, and carrying out the data re-transmission if necessary. Note that the data is already processed to some extent at the ATM network side, so that the processing at the computer side (including OS and network protocol processing programs) is light.

Now, based on the above description, the main processings at each unit on the client side and the server side will be summarized.

[1] Network Shared Memory Management Unit 21 (client side):

This unit receives the sharing set up request.

This unit requests the network management unit 24 to set up the virtual connection with the server side computer to be in the sharing relationship with this client side computer.

This unit obtains the specified real memory or a real memory in a necessary size, and requests the data transfer to the network pager 23.

[2] Network Management Unit 24 (client side):

This unit sets up a new virtual connection by carrying out a call set up with the ATM switch 3.

This unit notifies the utilization purpose of this virtual connection to the server side computer at a time of connection request, by utilizing the additional information function (usr-usr information in the call set up cell, usr-usr message cell that can be exchanged between end-to-end hosts at a time of call set up, etc.) at a time of the call set up in the ATM scheme. This virtual connection is dedicated for use by the data transfer for this shared region.

This unit carries out the flow control, the error detection, the congestion control, etc. for this virtual connection.

[3] Network Pager 23 (client side):

This unit is called up from the network shared memory management unit 21 after the shared region set up is completed.

This unit requests a start position of the address, a size, etc. which are necessary for the data transfer, to the server side computer, by utilizing the virtual connection notified at a time of initialization.

In a case of read, the data are transmitted from the server side computer, so that the received data is stored in the real memory 14.

In a case of write, after the transfer request cell is transmitted, the data is entered into a cell and this cell is transmitted.

[4] Network Management Unit 24 (server side):

This unit receives the call set up request cell from the ATM switch 3, and sets up a new virtual connection.

This unit learns the utilization purpose of this new virtual connection from the additional information at a time of the call set up, and when it is a new virtual connection for the network shared region, the control is shifted to the network shared memory management unit 21 (server side).

Thereafter, when the transfer request cell is received, the control is shifted to the network pager 23 which is responsible for this virtual connection.

This unit carries out the flow control, the error detection, the congestion control, etc. for this virtual connection.

[5] Network Shared Memory Management Unit 21 (server side):

This unit receives a new virtual memory space sharing request from the network management unit 24.

This unit carries out the initial setting by communicating with the network shared memory management unit 21 on the client side by utilizing the new virtual connection. In other words, a virtual memory space ID, a start position of the virtual address, a size, etc. on the server side are notified. This unit notifies these information to the virtual memory space management unit 22, and checks whether it is possible to share the requested region.

This unit calls the network pager 23 which is responsible for this shared region, and notifies the obtained virtual connection identifier.

Thereafter, whenever there is a read request or a write request from the virtual connection, this unit carries out the data read/write operation with respect to the region at the virtual address corresponding to the request.

[6] Network Pager 23 (server side):

This unit is called up from the network management unit 24 when there is an actual data transfer request.

A data transfer direction (read or write) for the corresponding region in the virtual memory space, as well as a start position of the virtual address, a size, etc. for the data transfer are notified from the client side computer to this unit.

In a case of read, the data block is read out from the virtual memory space, entered into a cell, and then transmitted to the client side computer.

In a case of write, the transfer request cell is received, and the data in the cell received thereafter is entered into the corresponding region, which is in the size specified by the transfer request cell and starting from the start address specified by the transfer request cell.

<Type 4>

Next, the processing in a case of Type 4 will be described in detail.

In this Type 4, a region in the real memory space on the client side and a region in the real memory space on the server side are to be shared.

Then, when the sharing start processing is completed or before the program, etc. makes an access to the shared region, the data transfer is to be carried out in advance, similarly as in Type 3.

Figure 15:
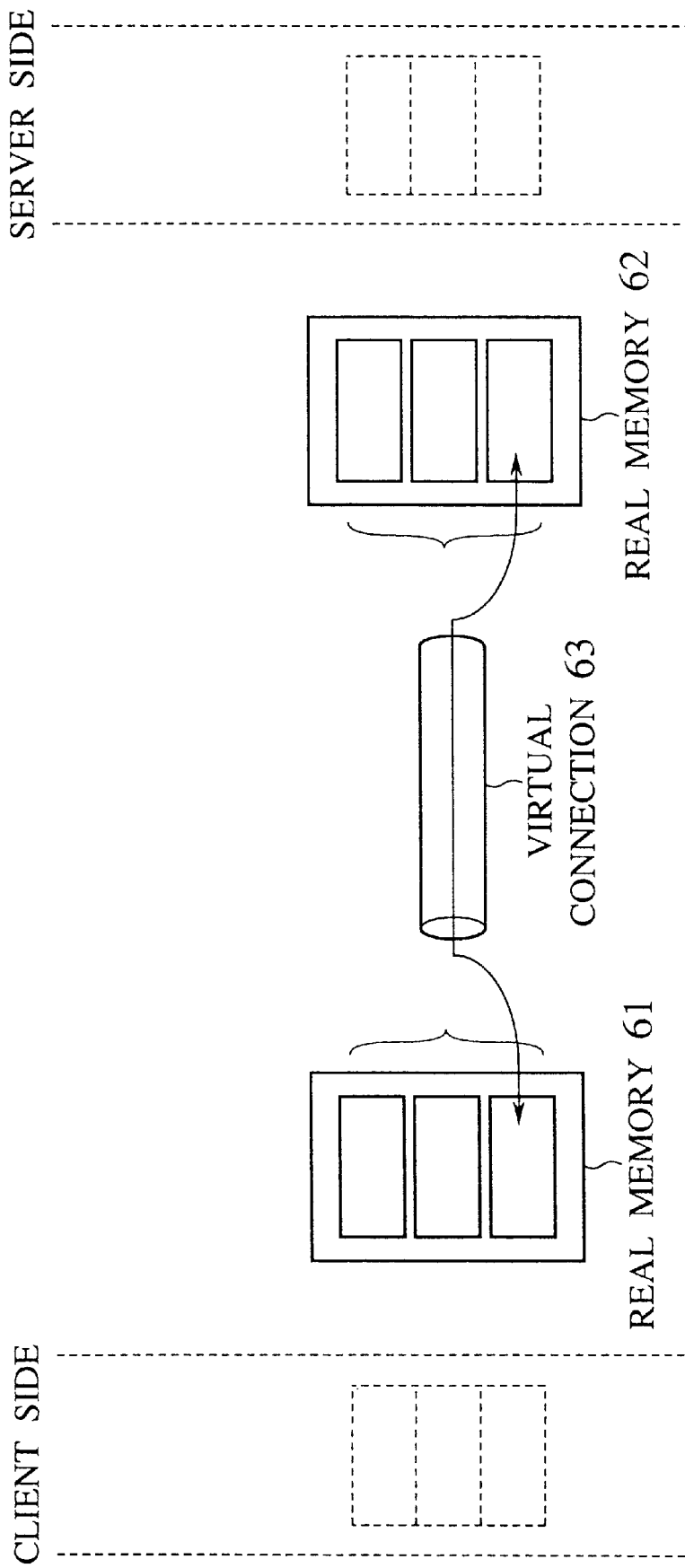
FIG. 15 is a diagram showing an overview of a sharing scheme Type 4 that can be used in one embodiment of the present invention.

FIG. 15 shows an overview of Type 4, where a region in the real memory 61 on the client side and a region in the real memory 62 on the server side are used as the shared regions through a virtual connection 63 which is connecting the shared region of the real memory 61 on the client side and the shared region of the real memory 62 on the server side.

<Application of Type 4>

Next, an application of Type 4 in which the data transfer in the shared regions is synchronized by the client side and the server side in addition to the above described Type 4 will be described.

Figure 16:
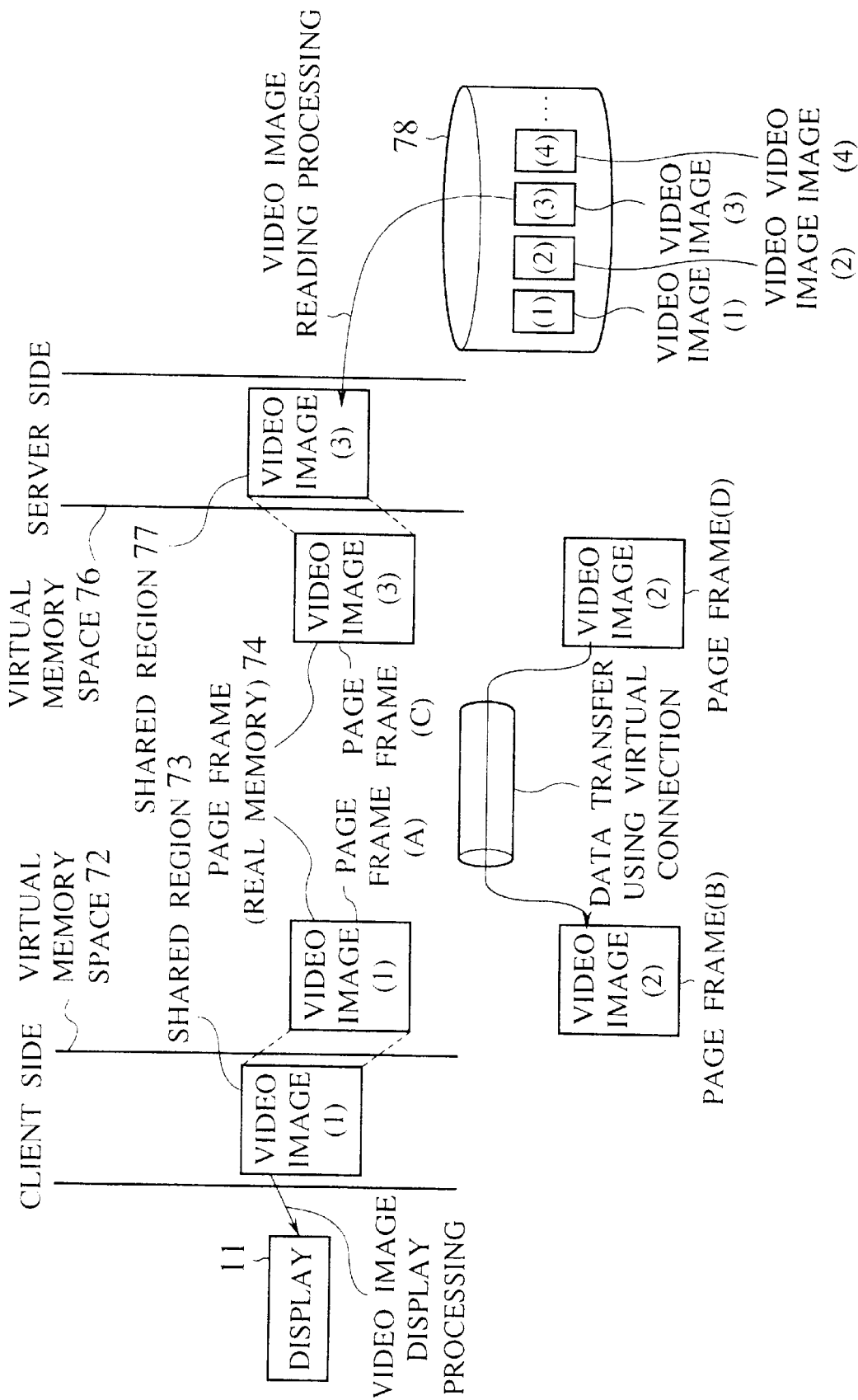
FIG. 16 is a diagram showing an operation at one stage in an exemplary case of an application of the sharing scheme Type 4.
Figure 17:
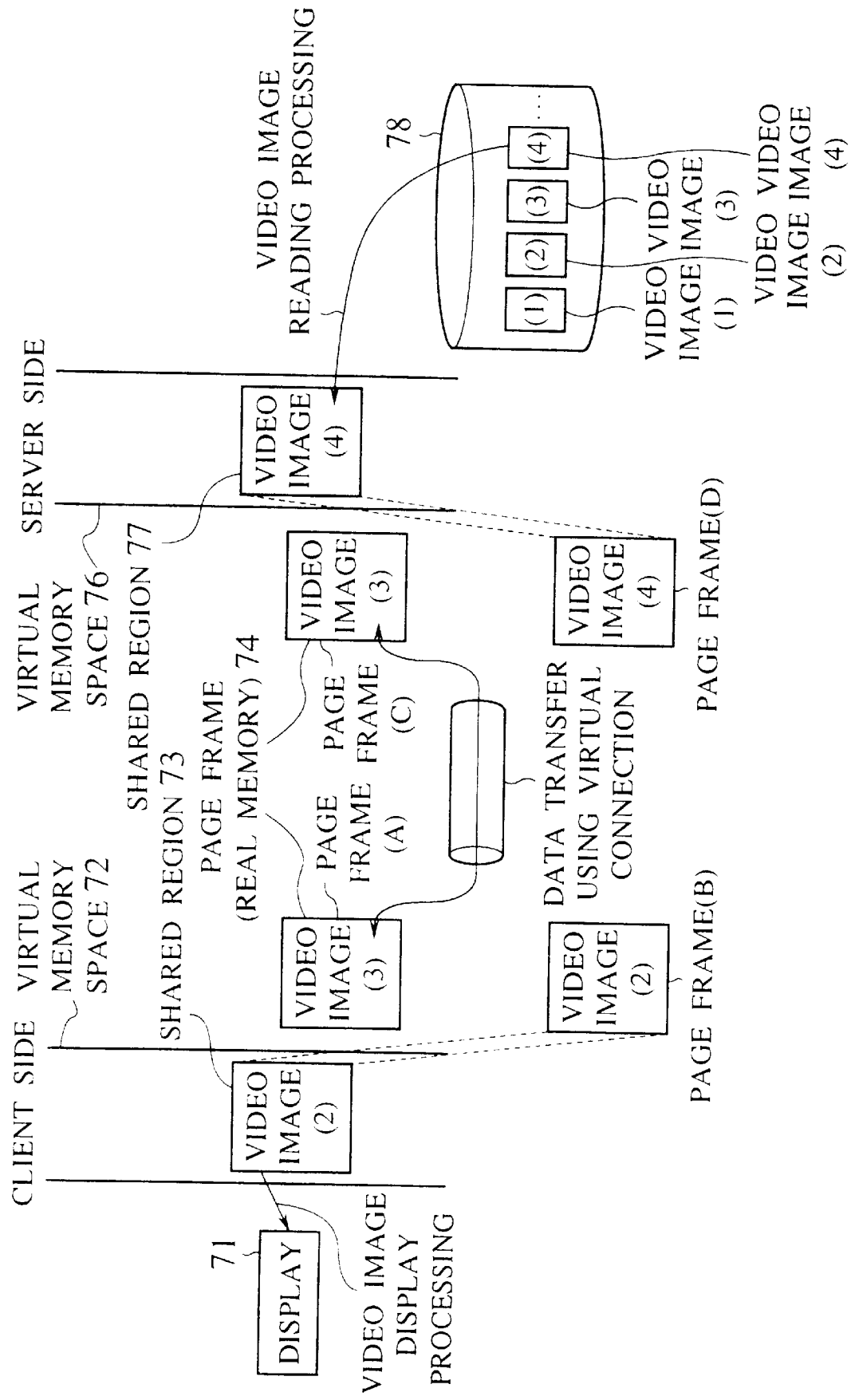
FIG. 17 is a diagram showing an operation at another stage in an exemplary case of an application of the sharing scheme Type 4.

FIG. 16 and FIG. 17 show a case of displaying the video images on the client side by transferring video image data from the server side to the client side, as an exemplary case of this application of Type 4. In FIG. 16 and FIG. 17, the video data (1) to (4) are originally stored in a hard disk 78.

Here, the size of the shared region is such that the size of the real memory is larger than the size of the virtual memory space. The real memory is managed by dividing the real memory into a plurality of regions.

In this case, a plurality of real memory regions are repeatedly allocated to the respective single shared virtual memory regions on the client side and the server side.

In this application of Type 4, it is assumed that the size of the allocated real memory is twice as large as the size of the virtual memory space. Consequently, the real memory is to be utilized by dividing the real memory into two regions.

On the client side, one video image data is already entered into the real memory 74 (page frame A) mapped into the shared region 73 in the virtual memory space 72, so that this video image data is read out and displayed on the display 71.

Meanwhile, on the client side, another real memory (page frame B) which is not mapped onto the virtual memory space is data transferred from the server side through the virtual connection. When the transfer is finished, and the image display from the real memory currently mapped onto the virtual memory space is finished by the image display program, the image display program issues (using the system call, etc.) a request for switching the real memory to be allocated to the same virtual memory space, to the network pager 23.

In response, when the data transfer from the server is already completed, the network pager 23 requests the virtual memory space management unit 22 to map that another real memory (page frame B) instead of the currently mapped real memory (page frame A).

When the above processing is finished, the image display program on the client side can read out and display the new video image data in the real memory from the same region in the virtual memory space.

The network pager 23 on the client side requests the data transfer to the server side while there is a room in the real memory, and enters the transferred data into an empty real memory (page frame A).

The network pager 23 on the server side operates similarly as the network pager 23 on the client side.

Namely, an empty real memory (page frame C) is originally mapped into the shared region 77 in the virtual memory space 76. For this virtual memory space, the image reading program on the server side sequentially reads out the video image data stored in the hard disk 78, and enters the read out video image data into that shared region 77 (while applying a necessary image data processing). When the shared region 77 is filled with the video image data, the image reading program issues (using the system call, etc.) a request for switching the real memory to be allocated to the same virtual memory space, to the network pager 23.

In response, when the data transfer to the client is already completed and there exists another empty real memory (page frame D), the network pager 23 requests the virtual memory space management unit 22 to map that another empty real memory (page frame D) instead of the currently mapped real memory (page frame C).

When the above processing is finished, the image reading program on the server side reads out the new video image data from the hard disk 78, and enters the read out video image data into the same region in the virtual memory space.

The network pager 23 on the server side carries out the data transfer to the client and fills the empty real memory, as long as there exists the real memory (page frame C) for which the data transfer is not yet finished.

In this manner, it is possible to realize the high speed data transfer between computers.

<On Name Server>

In the above, when the dedicated virtual connection between the shared regions is not yet set up, the set up of the virtual connection is made by transmitting the call set up cell to request a set up of the virtual connection, and registering the information such as VPI/VCI value which is necessary in using the virtual connection into the page table entry after the virtual connection is set up.

However, when the location of the computer which owns the resource to be accessed is unknown as it is not notified from the user or the program, it is also possible to realize the virtual connection set up by inquiring the name server 5 which manages the locations of the resources such as data blocks over the entire distributed computer system in order to ascertain the location of the server side computer, setting up the virtual connection to this server side computer informed by the name server 5 if necessary, and registering the information such as VPI/VCI value which is necessary in using the virtual connection into the page table entry. Such a case arises when the user specified the file name in the distributed file system as the shared region. In this case, the file name is position transparent, so that the actual location of the computer which owns the file resource is unknown.

It is also possible to register in advance the identifier of the virtual connection for a direct connection with the name server 5 as a default value in the page table 16, for the page table entry related to the resource which is not owned by the own computer.

In this case, when there arises a need to learn the computer (owner computer) which owns the resource to be accessed, the operation according to the flow chart of FIG. 18 is carried out as follows.

Namely, in order to learn the owner computer, the name server 5 is inquired by using the virtual connection identifier such as VPI/VCI value registered in the corresponding page table entry (step S31).

Then, the information necessary for the region sharing processing such as the owner computer, a range of the shared region, etc. is returned from the name server 5 (step S32).

Then, by using this information notified from the name server 5, the set up of the shared region with respect to the owner computer is requested to the network shared memory management unit 21 (step S33).

Thereafter, the shared region set up processing is similar as described above. The network shared memory management unit 21 sets up the virtual connection with respect to the shared region of the owner computer, and registers the identifier such as VPI/VCI of this virtual connection into the corresponding page table entry in the sharing range. In addition, the initialization of the network pager is also similarly carried out.

In this case, the pager processing at a time of the data transfer should be modified as follows.

Namely, when the page fault occurs on the client side, and when the "existence bit" is 0, the "processing bit" is 0 and the "hard disk bit" is 0 but the "remote host bit" is 1, the "frame number" field of the page table entry corresponding to the virtual frame registers the information such as VPI/VCI value which is necessary in communicating with the name server 5 which manages the locations of the resources, rather than the identifier of the virtual connection for carrying out the data transfer for that shared region (as can be recognized because the registered value is a special value different from any VPI/VCI value for the data transfer).

Consequently, the cell for inquiring the owner computer and a range of the shared region is produced and transmitted by using the registered information such as VPI/VCI value, and the response from the name server 5 is awaited.

When the response from the name server 5 is received, the shared region set up processing is carried out as described above, by using the information necessary in communicating with the owner computer which is notified by the response.

Thereafter, the processing similar to that of the step S14 to S20 of FIG. 12B described above is to be carried out.

As described above, according to the present invention, in the distributed computer system in which a plurality of computers are connected through a network (such as an ATM network), a part or a whole of the virtual space or the real memory space (real memory) is shared and the direct high speed data transfer can be carried out by utilizing the dedicated virtual connection that has been set up for each shared region. Consequently, it is possible to realize an efficient memory space sharing without requiring a complicated and inefficient communication protocol processing at the computer side. Thus, there is no need for a call set up every time the referring or the writing (read or write) with respect to the shared space occurs, and the data transfer can be carried out immediately.

Also, the control during the data transfer such as the call set up, the error detection, the congestion control, etc. can be largely handled at the ATM switch side, so that it suffices for the computer side to manage only the part which is insufficient for its function (such as the error correction or the re-transmission in a case of the data error, for example), and therefore the processing on the computer side can be reduced considerably.

In addition, by utilizing the high speed network such as an ATM network, it is possible to construct the distributed computer system by connecting the computers which are distanced from each other to some extent, so that the configuration can be highly flexible.

Also, according to the present invention, in a case of making an access to the resource belonging to another computer, the virtual connection identifier (VPI/VCI value, etc.) which is necessary in using the connection to that another computer can be obtained, by simply referring to the page table which is used at a time of translating the virtual address to the physical address.

For this reason, in a case of requesting the transfer of the data block in the necessary size among the resources belonging to that another computer, the request cell can be produced by using the virtual connection identifier obtained from the page table, without referring to various tables as in a conventional case, so that the request cell can be produced efficiently.

In addition, according to the present invention, by registering the virtual connection identifier for a direct connection with the name server, which manages a correspondence between the data and the computer (owner computer) which owns the data, as the default value in the field for registering the virtual connection identifier in the page table, it is possible to inquire the name server quickly by using the virtual connection identifier registered in the corresponding page table entry when there arises a need to learn the computer (owner computer) which owns the data to be accessed.

Moreover, according to the present invention, in a case of sharing a part or a whole of the real memory space on the client side and a part or a while of the virtual memory space or the real memory space on the server side are shared, the page fault does not occur because the real memory space (real memory) is already allocated to the shared region on the client side. In this case, the data transfer is carried out immediately after the virtual connection set up (independently from an access on the client side), instead of carrying out the data transfer when an actual access occurs on the client side.

For this reason, when an access to the virtual memory space is made by the user program, thread, etc., the page fault does not occur because the real memory space (real memory) is already allocated, so that the page fault processing is unnecessary and the data can be accessed immediately. Consequently, it is possible to realize the high speed user program execution such as that for the real time processing.

Furthermore, according to the present invention, a part of the virtual memory space of the client computer and a part of the virtual memory space of the server computer are shared, while a plurality of real memory regions are allocated to a single shared region of the virtual memory space, and the data transfer is carried out by using the dedicated virtual connection between the real memory spaces which are currently not mapped into the regions in the virtual memory spaces, while the real memory region is sequentially switched such that the real memory region for which the data transfer is completed is mapped into the region in the virtual memory space. Consequently, it is possible to realize the high speed data transfer between the computers, in units of the size of the region in the virtual memory space.

It is to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method of memory space management in a distributed computer system formed by a plurality of computers connected through virtual connections provided by a network, the method comprising:

sharing one region among a plurality of regions in a virtual memory space/real memory space managed by one computer and another region among a plurality of regions in a virtual memory space/real memory space managed by another computer;

setting up a dedicated virtual connection between said one region and said another region which are shared between said one computer and said another computer at the sharing step, the dedicated virtual connection being dedicated for data transfers between said one region and said another region; and carrying out data transfers between said one region and said another region by using the dedicated virtual connection set up at the setting step.

2. The method of claim 1, further comprising the steps of:

managing a virtual memory space by using a page table which registers a relation between a virtual address of the virtual memory space and a corresponding physical address of a real memory space or an information necessary in making an access to a computer which owns data to be accessed; and registering a virtual connection identifier of the dedicated virtual connection set up at the setting step in an entry of the page table, as the information necessary in making an access to a computer which owns data to be accessed, such that the carrying out step carries out the data transfers using the dedicated virtual connection by referring to the virtual connection identifier registered in said entry of the page table.

3. The method of claim 2, wherein the page table has one field for registering the virtual connection identifier, and the managing step registers a virtual connection identifier to be used in connecting to a name server which manages a correspondence between data and an owner computer of said data, as a default value for said one field.

4. The method of claim 1, wherein the carrying out step carries out the data transfers when an actual access to the shared regions is made.

5. The method of claim 1, wherein the carrying out step carries out the data transfers when said one region and said another region are shared at the sharing step.

6. The method of claim 1, wherein the carrying out step carries out the data transfers before an actual access to the shared regions is made.

7. A computer in a distributed computer system formed by a plurality of computers connected through virtual connections provided by a network, said computer comprising:

a virtual memory space management unit configured to manage a virtual memory space by using a page table which registers a set of a virtual address of the virtual memory space and a corresponding physical address of a real memory space or an information necessary in making an access to a computer which owns data to be accessed;

a command unit configured to command a set up of a dedicated virtual connection between shared regions, the shared regions including one region among a plurality of regions in the virtual memory space managed by the virtual memory space management unit and another region among a plurality of regions in a virtual memory space/real memory space managed by another computer, the dedicated virtual connection being dedicated for data transfers among the shared regions;

a registration unit configured to register a virtual connection identifier of the dedicated virtual connection in an entry of the page table corresponding to said one region, as the information necessary in making an access to a computer which owns data to be accessed; and a transfer unit configured to carry out data transfers by using the dedicated virtual connection set up between the shared regions, by referring to the virtual connection identifier registered in said entry of the page table before each data transfer between the shared regions is to be carried out, and specifying the dedicated virtual connection to be used for each data transfer according to the virtual connection identifier obtained from the page table.

8. The computer of claim 7, wherein the page table includes:

a frame number field for storing one of virtual connection identifier/virtual path identifier (VCI/VPI) data, frame data corresponding to a page frame, and sector data;

a processing bit field for storing a bit indicating whether or not a request for access to a corresponding page table entry in the page table has been completed;

a hard disk bit field for storing a bit indicating whether information stored in the corresponding frame number field is a sector in a hard disk of said computer; and a remote host bit for storing a bit indicating whether information stored in the corresponding frame number field is VCI/VPI data.

9. The computer of claim 8, wherein the page table further includes:

an existence bit field for storing a bit indicating whether the page frame in the corresponding frame number field is loaded on the real memory space.

10. The computer of claim 7, wherein the page table has one field for registering the virtual connection identifier, and the virtual memory space management unit registers a virtual connection identifier to be used in connecting to a name server which manages a correspondence between data and an owner computer of said data, as a default value for said one field.

11. A computer in a distributed computer system formed by a plurality of computers connected through virtual connections provided by a network, said computer comprising:

a set up unit configured to set up a dedicated virtual connection between shared regions, the shared regions including one region among a plurality of regions in a real memory space managed by said computer and another region among a plurality of regions in a virtual memory space/real memory space managed by another computer, the dedicated virtual connection being dedicated for data transfers among the shared regions;

a transfer unit configured to carry out data transfers by using the dedicated virtual connection set up between the shared regions, when said one region and said another region are shared, or before an actual access to the shared regions is made.

12. A data transfer method for transferring data between regions of virtual memory spaces shared by different computers in a distributed computer system formed by a plurality of computers connected through virtual connections provided by a network, the method comprising:

sharing one region among a plurality of regions in a virtual memory space managed by one computer and another region among a plurality of regions in a virtual memory space managed by another computer as shared regions, and allocating a plurality of real memory regions to at least one of the shared regions in virtual memory spaces;

setting up a dedicated virtual connection for the shared regions in virtual memory spaces which are shared at the sharing step, the dedicated virtual connection being dedicated for data transfers among the shared regions;

carrying out data transfers by using the dedicated virtual connection set up at the setting step, between real memory regions which are currently not mapped into the shared regions in virtual memory spaces; and sequentially switching a real memory region which is mapped into said at least one of the shared regions in virtual memory spaces, by sequentially mapping a real memory region for which each data transfer at the carrying out step is completed, into said at least one of the shared regions in virtual memory spaces.

13. The method of claim 12, wherein at the sequentially switching step, a real memory region which is actually mapped into said one of the shared regions is sequentially switched by using a system call.

14. A computer usable medium having computer readable program code stored therein for causing a computer to function as a system for managing memory space in a distributed computer system formed by a plurality of computers connected through virtual connections provided by a network, the computer readable program code including:

a first computer readable program code unit for causing said computer to share one region among a plurality of regions a virtual memory space/real memory space managed by said computer and another region among a plurality of regions in a virtual memory space/real memory space managed by another computer;

a second computer readable program code unit for causing said computer to set up a dedicated virtual connection between said one region and said another region which are shared between said computer and said another computer by the first computer readable program code unit, the dedicated virtual connection being dedicated for data transfers between said one region and said another region; and a third computer readable program code unit for causing said computer to carry out data transfers between said one region and said another region by using the dedicated virtual connection set up by the second computer readable program code unit.

15. A computer usable medium having computer readable program code stored therein for causing a computer to function as a system for transferring data between regions of virtual memory spaces shared by different computers in a distributed computer system formed by a plurality of computers connected through virtual connections provided by a network, the computer readable program code including:

a first computer readable program code unit for causing said computer to share one region among a plurality of regions in a virtual memory space managed by said computer and another region among a plurality of regions in a virtual memory space managed by another computer as shared regions, and for allocating a plurality of real memory regions to at least one of the shared regions in virtual memory spaces;

a second computer readable program code unit for causing said computer to set up a dedicated virtual connection for the shared regions in virtual memory spaces which are shared by the first computer readable program code unit, the dedicated virtual connection being dedicated for data transfers among the shared regions;

a third computer readable program code unit for causing said computer to carry out data transfers by using the dedicated virtual connection set up by the second computer readable program code unit, between real memory regions which are currently not mapped into the shared regions in virtual memory spaces; and a fourth computer readable program code unit for causing said computer to sequentially switch a real memory region which is mapped into said at least one of the shared regions in virtual memory spaces, by sequentially mapping a real memory region for which each data transfer by the third computer readable program code unit is completed, into said at least one of the shared regions in virtual memory spaces.

* * * * *